US012783008B2

(12) United States Patent
Heo et al.

(10) Patent No.: US 12,783,008 B2
(45) Date of Patent: Nov. 3, 2026

(54) RING-TYPE WEARABLE ELECTRONIC DEVICE

(71) Applicant: Samsung Electronics Co., Ltd., Suwon-si (KR)

(72) Inventors: Jeonhoe Heo, Suwon-si (KR); Jaeseung Hong, Suwon-si (KR); Dohan Lim, Suwon-si (KR); Hyunsuk Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 287 days.

(21) Appl. No.: 18/430,032

(22) Filed: Feb. 1, 2024

(65) Prior Publication Data

US 2024/0329685 A1 Oct. 3, 2024

Related U.S. Application Data

(63) Continuation of application No. PCT/KR2024/000636, filed on Jan. 12, 2024.

(30) Foreign Application Priority Data

Mar. 31, 2023 (KR) ........................ 10-2023-0043220
Apr. 18, 2023 (KR) ........................ 10-2023-0050906
Sep. 15, 2023 (KR) ........................ 10-2023-0123151

(51) Int. Cl.
*G06F 1/16* (2006.01)

(52) U.S. Cl.
CPC .................................... *G06F 1/163* (2013.01)

(58) Field of Classification Search
CPC .. G06F 1/163; G06F 3/014; G06F 2203/0331; G06K 19/07762; A61B 5/02438; B29L 2031/7096
See application file for complete search history.

(56) References Cited

U.S. PATENT DOCUMENTS 9,495,575 B2 * 11/2016 Kim ................... G06V 40/1365
9,582,034 B2 * 2/2017 von Badinski ........... H02J 7/35
(Continued)

FOREIGN PATENT DOCUMENTS

CN 110477882 A 11/2019
JP 5777122 B2 9/2015
(Continued)

OTHER PUBLICATIONS

International Search Report dated Apr. 15, 2024, issued in International Patent Application No. PCT/KR2024/000636.
(Continued)

*Primary Examiner* — Gage Crum
(74) *Attorney, Agent, or Firm* — Jefferson IP Law, LLP

(57) ABSTRACT

A ring-shaped wearable electronic device may comprise a ring-shaped outer frame including an inner surface. The ring-shaped wearable electronic device may comprise a fixing portion protruding from the inner surface of the outer frame. The ring-shaped wearable electronic device may comprise an inner frame integrally formed on the outer frame to cover the electronic component, the fixing portion, and the inner surface of the outer frame, the inner frame may have a ring-shaped opening configured to receive a finger of a user. The fixing portion may include a plurality of first ribs located to an upper end portion of the outer frame and spaced apart from each other and a plurality of second ribs located to a lower end portion of the outer frame and spaced apart from each other. At least a portion of the electronic component may be disposed between the plurality of ribs so that the at least one electronic component is fixed to the outer frame with the inner frame integrally formed on the outer frame.

19 Claims, 35 Drawing Sheets

(56) References Cited

U.S. PATENT DOCUMENTS

| | | | | |
|---|---|---|---|---|
| 10,156,867 | B2 | 12/2018 | Von Badinski et al. | |
| 10,893,833 | B2 | 1/2021 | Haverinen et al. | |
| 11,324,292 | B2 * | 5/2022 | Min | A44C 9/0053 |
| 11,599,147 | B2 | 3/2023 | Von Badinski et al. | |
| 11,850,069 | B1 * | 12/2023 | Mars | A61B 5/6826 |
| 11,963,590 | B2 | 4/2024 | Min et al. | |
| 12,213,790 | B2 * | 2/2025 | Lee | A61B 5/02141 |
| 2018/0120891 | A1 * | 5/2018 | Eim | H04M 1/0235 |
| 2018/0343989 | A1 * | 12/2018 | McLear | G06K 19/07762 |
| 2019/0357642 | A1 | 11/2019 | Mclear et al. | |
| 2020/0163422 | A1 | 5/2020 | Mclear et al. | |
| 2020/0178395 | A1 * | 6/2020 | Graber | H05K 1/189 |
| 2021/0037932 | A1 * | 2/2021 | Min | A61B 5/0006 |
| 2023/0112231 | A1 * | 4/2023 | Huttunen | A61B 5/6826 600/301 |
| 2023/0148716 | A1 * | 5/2023 | Zhou | A44C 5/0007 224/217 |
| 2023/0380692 | A1 * | 11/2023 | Huttunen | G06F 1/163 |
| 2024/0081012 | A1 * | 3/2024 | Haverinen | A61B 5/6826 |
| 2024/0122315 | A1 * | 4/2024 | Su | A44C 9/0053 |
| 2024/0291317 | A1 * | 8/2024 | Lin | H02J 50/00 |
| 2025/0064332 | A1 * | 2/2025 | Lee | A61B 5/02438 |

FOREIGN PATENT DOCUMENTS

| | | | | |
|---|---|---|---|---|
| JP | 2017-506376 | A | 3/2017 | |
| JP | 3236465 | U | 2/2022 | |
| KR | 101615456 | B1 * | 4/2016 | C23C 22/73 |
| KR | 10-1632014 | B1 | 6/2016 | |
| KR | 10-2017-0091346 | A | 8/2017 | |
| KR | 10-2018-0131499 | A | 12/2018 | |
| KR | 10-2344609 | B1 | 12/2021 | |
| KR | 10-2022-0060783 | A | 5/2022 | |
| WO | 2015/081321 | A1 | 6/2015 | |
| WO | WO-2015129556 | A1 * | 9/2015 | G06F 3/0346 |
| WO | WO-2021017915 | A1 * | 2/2021 | A61B 5/11 |

OTHER PUBLICATIONS

International Search Report dated Apr. 15, 2024, issued in an International Application No. PCT/KR2024/000636.

* cited by examiner

RING-TYPE WEARABLE ELECTRONIC DEVICE

CROSS-REFERENCE TO RELATED APPLICATION(S)

This application is a continuation application, claiming priority under § 365(c), of an International application No. PCT/KR2024/000636, filed on Jan. 12, 2024, which is based on and claims the benefit of a Korean patent application number 10-2023-0043220, filed on Mar. 31, 2023, in the Korean Intellectual Property Office, of a Korean patent application number 10-2023-0050906, filed on Apr. 18, 2023, in the Korean Intellectual Property Office, and of a Korean patent application number 10-2023-0123151, filed on Sep. 15, 2023, in the Korean Intellectual Property Office, the disclosure of each of which is incorporated by reference herein in its entirety.

BACKGROUND

1. Field

Various embodiments of the disclosure relate to a ring-shaped wearable electronic device having a hole into which the user's body part may be inserted.

2. Description of Related Art

Wearable electronic devices are devices, such as clothes, watches, or glasses, which may be freely worn on the user's body. Wearable electronic devices may be classified into various types, such as smart glasses, smart watches, and ring-type wearable electronic devices (or smart rings), depending on their shape.

Among wearable electronic devices, the ring-shaped wearable electronic device is worn on the user's body part through a ring formed therein. A smart ring may be able to detect the user's biometric signals through various sensors included therein when worn by the user, analyze the user's biometric signals detected, and provide the user with analysis data, such as the user's pulse, a sleep level, blood pressure, or the like.

SUMMARY

A ring-shaped wearable electronic device may include an outer frame, forming an outer portion of the wearable electronic device and an inner frame forming an inner portion of the wearable electronic device and integrally coupled to the outer frame. If a bonding force between the outer frame and the inner frame is not sufficiently secured, the outer frame and the inner frame may be detached or separated from each other during when the user puts on or pulls out the ring-shaped wearable electronic device from his/her finger.

Various embodiments of the disclosure may provide a ring-shaped wearable electronic device having a structure for reinforcing the bonding between the outer frame and the inner frame on the inner surface of the outer frame.

Various embodiments of the disclosure may provide a ring-shaped wearable electronic device having a structure for reinforcing the rigidity of the outer frame on the inner surface of the outer frame.

A ring-shaped wearable electronic device according to an embodiment of the disclosure may comprise a ring-shaped outer frame including an inner surface. The ring-shaped wearable electronic device may comprise a fixing portion protruding from the inner surface of the outer frame. The ring-shaped wearable electronic device may comprise an inner frame integrally formed on the outer frame to cover the electronic component, the fixing portion, and the inner surface of the outer frame, the inner frame may have a ring-shaped opening configured to receive a finger of a user. The fixing portion may include a plurality of first ribs located to an upper end portion of the outer frame and spaced apart from each other and a plurality of second ribs located to a lower end portion of the outer frame and spaced apart from each other. At least a portion of the electronic component may be disposed between the plurality of ribs so that the at least one electronic component is fixed to the outer frame with the inner frame integrally formed on the outer frame.

According to various embodiments of the disclosure, as the irregularity pattern or recess-shaped bonding reinforcing portion is provided in the edge portion of the inner surface of the outer frame, the bonding cross section between the outer frame and the inner frame may be increased so as to increase the bonding force between the outer frame and the inner frame.

According to various embodiments of the disclosure, as a structure formed to extend in the circumferential direction or vertical direction is disposed on the inner surface of the outer frame, the rigidity of the outer frame against the loads in the radial direction or vertical direction may be increased.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The same or similar reference denotations may be used to refer to the same or similar elements throughout the specification and the drawings.

The above and other aspects, features, and advantages of certain embodiments of the disclosure will be more apparent from the following description taken in conjunction with the accompanying drawings, in which.

DETAILED DESCRIPTION

It should be appreciated that various embodiments of the disclosure and the terms used therein are not intended to limit the technological features set forth herein to particular embodiments and include various changes, equivalents, or replacements for a corresponding embodiment.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

It will be further understood that the terms "comprise" and/or "have," as used herein, specify the presence of stated features, integers, steps, operations, elements, and/or components, but do not preclude the presence or addition of one or more other features, integers, steps, operations, elements, components, and/or groups thereof.

It will be understood that when a component is referred to as "connected to," "coupled to," "supported on," or "contacting" another component, the components may be connected to, coupled to, supported on, or contact each other directly or via a third component.

Throughout the specification, when one component is positioned "on" another component, the first component may be positioned directly on the second component, or other component(s) may be positioned between the first and second component.

The term "and/or" may denote a combination(s) of a plurality of related components as listed or any of the components.

Hereinafter, the working principle and embodiments of the disclosure are described with reference to the accompanying drawings.

Figure 1:
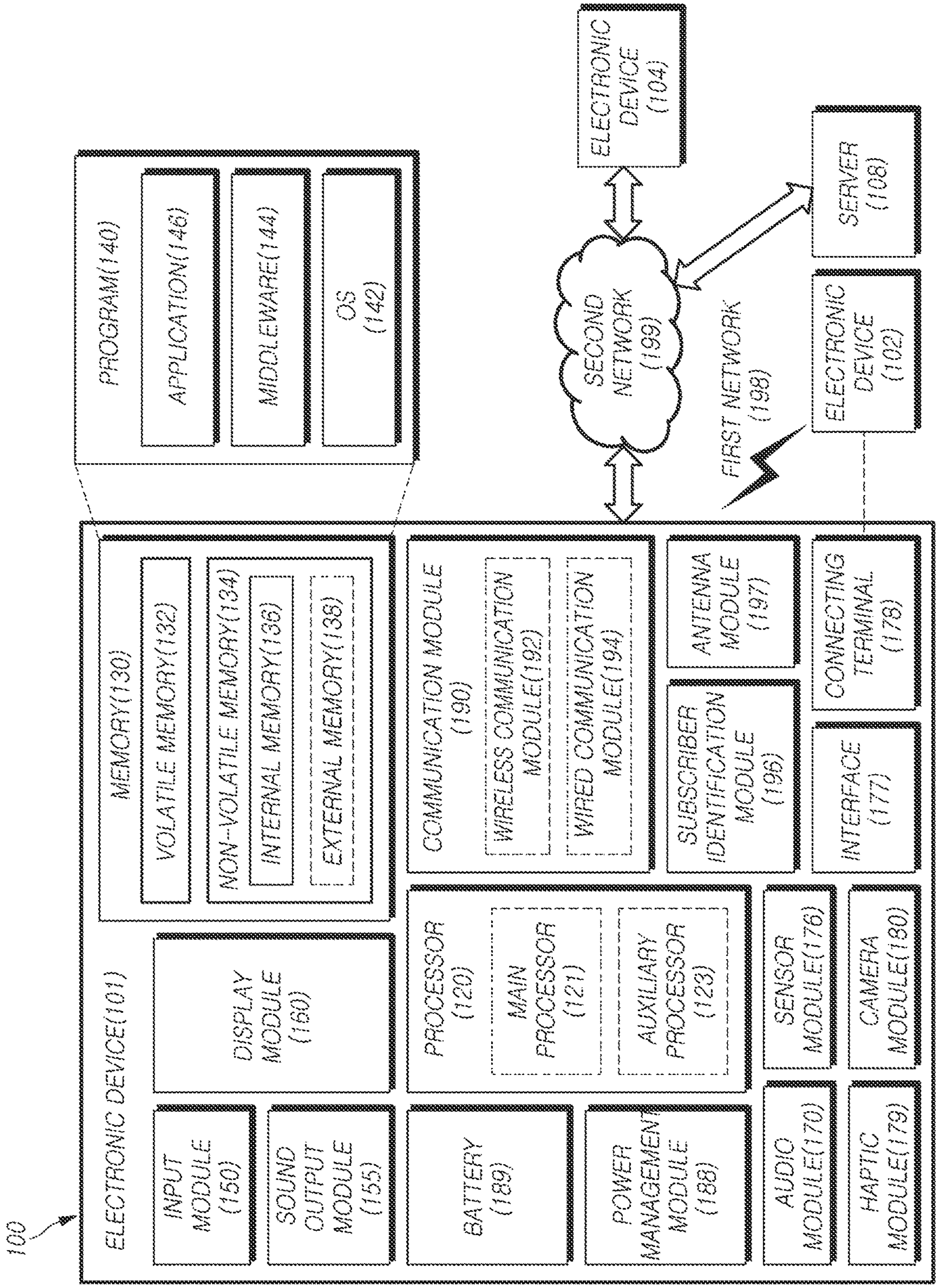
FIG. 1 is a view illustrating an electronic device in a network environment according to various embodiments.

FIG. 1 is a block diagram illustrating an electronic device 101 in a network environment 100 according to various embodiments.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a $5^{th}$ generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

In an embodiment, the ring-shaped wearable electronic device of the disclosure may detect the user's biometric signals through various sensors. In some embodiments, the ring-shaped wearable electronic device may analyze the detected biometric signal and may wirelessly transmit analysis data, such as pulse, a sleep level, blood pressure, or the like to a preset external device (e.g., user equipment having a display, a monitor, a television (TV), or the like) to provide the analysis data in the form of a character, a number, or an image to the user. Further, in some embodiments, the ring-shaped wearable electronic device according to the disclosure may separately include a display, and in this case, the analysis data in the form of a character, a number, or an image may be provided to the user through the display.

Hereinafter, a configuration of a ring-shaped wearable electronic device according to an embodiment of the disclosure is described in detail with reference to the accompanying drawings.

Figure 2A:
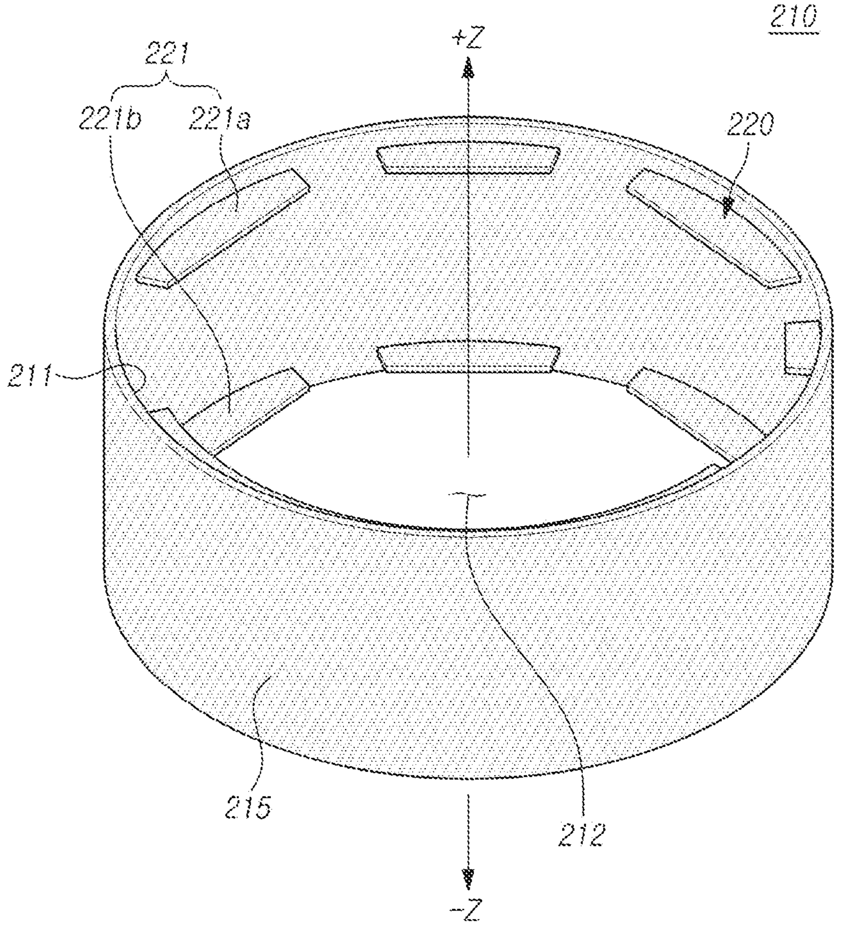
FIG. 2A is a perspective view illustrating an outer frame and a fixing portion installed on the outer frame in a ring-shaped wearable electronic device according to an embodiment of the disclosure.
Figure 2B:
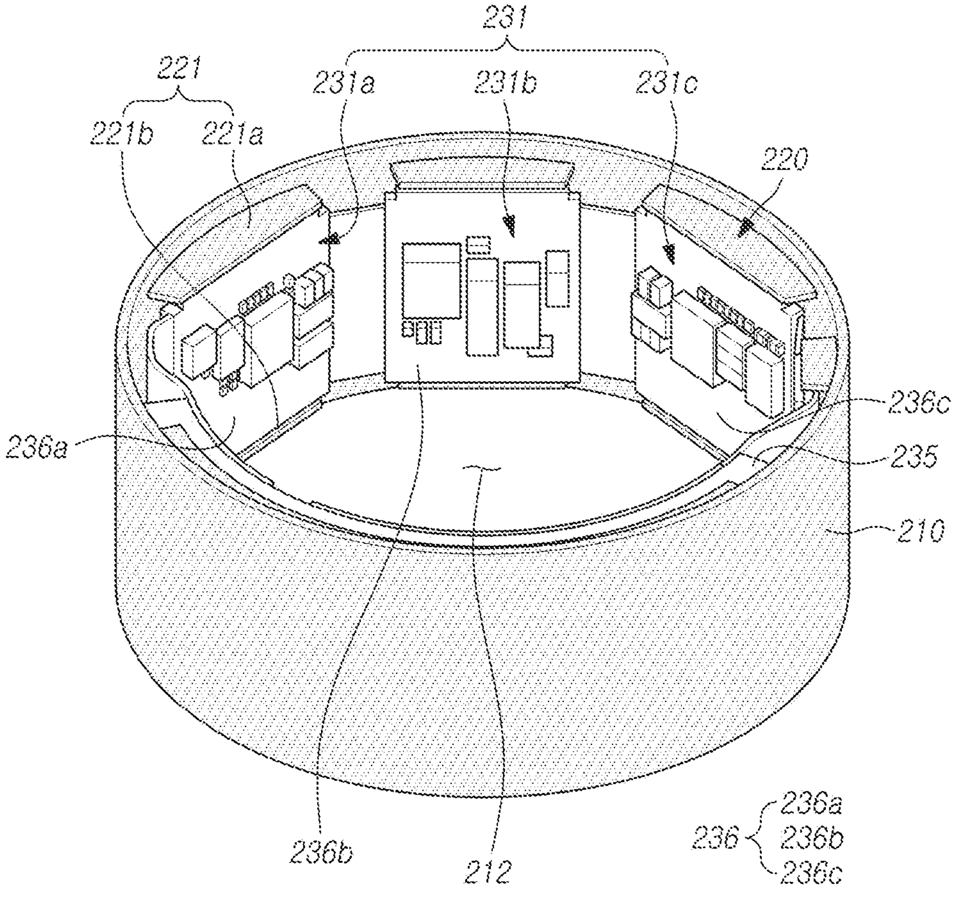
FIG. 2B is a perspective view illustrating a state in which an electronic component portion coupled to an outer frame according to an embodiment of the disclosure.
Figure 2C:
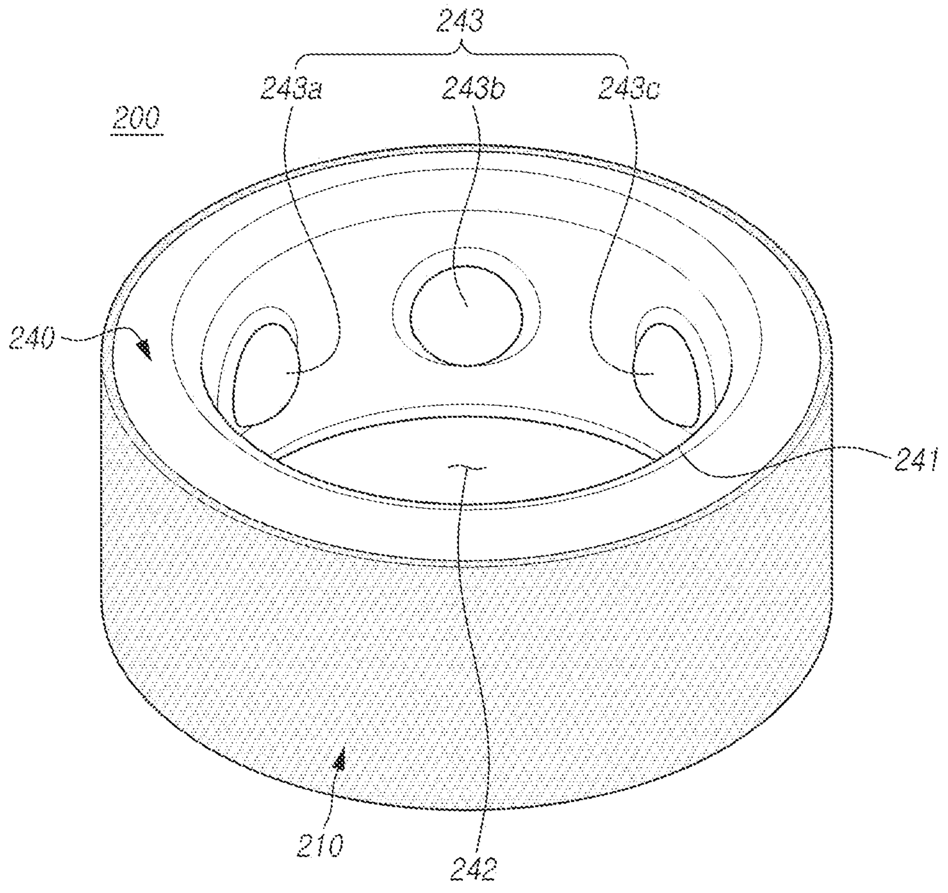
FIG. 2C is a perspective view illustrating a ring-shaped wearable electronic device according to an embodiment of the disclosure.

FIG. 2A is a perspective view illustrating an outer frame and a fixing portion installed on the outer frame of a ring-shaped wearable electronic device according to an embodiment of the disclosure. FIG. 2B is a perspective view illustrating an electronic component portion fixed to an outer frame according to an embodiment of the disclosure. FIG. 2C is a perspective view illustrating a ring-shaped wearable electronic device according to an embodiment of the disclosure.

Referring to FIGS. 2A to 2C, a wearable electronic device 200 (e.g., the electronic device 101 of FIG. 1) according to an embodiment may be configured to have an overall ring shape to be put on or taken off of the user's finger. For example, the wearable electronic device 200 may be provided in a circular shape, but the disclosure is not limited thereto.

According to an embodiment, the wearable electronic device 200 may include an outer frame 210, a fixing portion 220, an electronic component portion 230, and an inner frame 240.

According to an embodiment, the outer frame 210 may form an outer portion of the wearable electronic device 200. In an embodiment, the outer frame 210 may have an inner surface 211 having an overall ring shape to define a hole 212 inside. In one embodiment of the disclosure, the outer frame 210 may have an outer surface 213 facing the inner circumferential surface 211. For example, the outer surface 213 of the outer frame 210 may have an overall ring shape like the inner circumferential surface 211 of the outer frame 210, but the present disclosure is not limited thereto. For example, the outer surface 213 of the outer frame 210 may be designed so that a cross-section cut in a plane perpendicular to a vertical direction (eg, ±Z-axis direction) has a polygonal shape. In an embodiment, the hole 212 defined inside the outer frame 210, may extend in the Z-axis direction, as illustrated in FIG. 2A. In an embodiment of the disclosure, the outer frame 210 may be formed of a metal material. For example, the outer frame 210 may be formed of a highly rigid titanium material, but the disclosure is not limited thereto. The outer frame 210 may be referred to as a metal member or outer part.

According to an embodiment of the disclosure, the fixing portion 220 may be configured to fix, secure, or house the electronic component portion 230 inside the outer frame 210. According to an embodiment of the disclosure, the fixing portion 220 may be provided on the inner surface 211 of the outer frame 210. Hereinafter, for convenience of description, the structure, function, and/or shape of the fixing portion 220 is described below with reference to FIGS. 4 and 5.

According to an embodiment of the disclosure, the electronic component portion 230 may include one or more circuit boards 236 on which various electronic components are disposed. According to an embodiment of the disclosure, the electronic component portion 230 may have a signal connection path through which signals may be exchanged between one or more circuit boards 236. According to an embodiment of the disclosure, the electronic component portion 230 may include at least one sensor unit 231 (e.g., the sensor module 176 of FIG. 1) for detecting, for example, the user's biometric signal. According to an embodiment of the disclosure, the one or more circuit boards **236*a*, 236*b*, and 236*c* included in the electronic component portion 230 may constitute the sensor units 231*a*, 231*b*, and 231*c*, respectively, but the disclosure is not limited thereto. According to an embodiment of the disclosure, in addition to various sensors (e.g., the sensors 2311 to 2316 of FIG. 3) for biometric signal detection, for example, various electronic components, such as a communication module (e.g., the communication module 190 of FIG. 1), a control module, an audio module (e.g., the audio module 170 of FIG. 1), a power module, an input module, and the like may be disposed on the one or more circuit boards 236 included in the electronic component portion 230. In an embodiment of the disclosure, at least one sensor unit 231 (or one or more circuit boards 236) of the electronic component portion 230** may be disposed inside or on the inner surface 211 by the fixing portion 220. In an embodiment of the disclosure, the electronic component portion 230 may be positioned between the ribs 221*a* and 221*b* of the plurality of rib pairs 221 of the fixing portion 220 provided on the inner surface 211 as is described below. The configuration of the electronic component portion 230 is described below with reference to FIG. 3.

According to an embodiment of the disclosure, the electronic component portion 230 may include a battery 235 (e.g., the battery 189 of FIG. 1) for supplying power to an electronic component, such as at least one sensor unit 231.

According to an embodiment of the disclosure, the inner frame 240 may be disposed inside the outer frame 210 to constitute an inner portion of the wearable electronic device 200. In an embodiment of the disclosure, a hole 242 into which the user's a body member (e.g., finger) is inserted may be provided inside the inner frame 240. For example, the hole 242 of the inner frame 240 may have a ring shape to accommodate the user's finger. In an embodiment of the disclosure, the hole 242 may be provided inside the hole 212 defined by the outer frame 210 described above. In an embodiment of the disclosure, the diameter of the inner frame 240 may be appropriately set according to the thickness of the user's body part, including a finger.

According to an embodiment of the disclosure, the inner frame 240 may be integrally coupled to the outer frame 210 to cover, as a whole, the inner surface 211, the fixing portion 220, and the electronic component portion 230 while the electronic component portion 230 is fixed, secured, or housed inside the outer frame 210 by the fixing portion 220.

In an embodiment of the disclosure, the inner frame 240 may be integrally coupled with the outer frame 210 by at least one of an injection process or a molding process. For example, the inner frame 240 may be formed integrally with the outer frame 210 by being molded directly inside the outer frame 210 with the electronic component portion 230 disposed between the ribs 221*a* and 221*b* of a plurality of rib pairs 221. For example, the inner frame 240 may be formed integrally with the outer frame 210 by injecting resin to contact at least a portion of the ribs 221*a* and 221*b* with the electronic component portion 230 disposed between the ribs of a plurality of rib pairs 221. In an embodiment of the disclosure, the inner frame 240 may be formed of a synthetic resin having a transparent material, but the disclosure is not limited thereto. For example, the inner frame 240 may be formed of an epoxy resin. The inner frame 240 may be referred to as an injection member, molding member, or inner part.

According to an embodiment of the disclosure, on the inner surface 241 of the inner frame 240 may be provided at least one biometric signal detector 243 protruding toward the inside of the hole 242, e.g., the center of the hole 242. In an embodiment of the disclosure, the number of biometric signal detectors 243 may correspond to the number of sensor units 231*a*, 231*b*, and 231*c* of the electronic component portion 230 described above, but the disclosure is not limited thereto. In an embodiment of the disclosure, corresponding sensor units 231*a*, 231*b*, and 231*c* may be positioned inside the plurality of biometric signal detectors 243*a*, 243*b*, and 243*c*. In this case, when the user wears the wearable electronic device 200, each of the plurality of sensor units 231, as a portion in contact with the user's body member (e.g., finger), may detect the user's body signal through the corresponding biometric signal detector 243.

Figure 3:
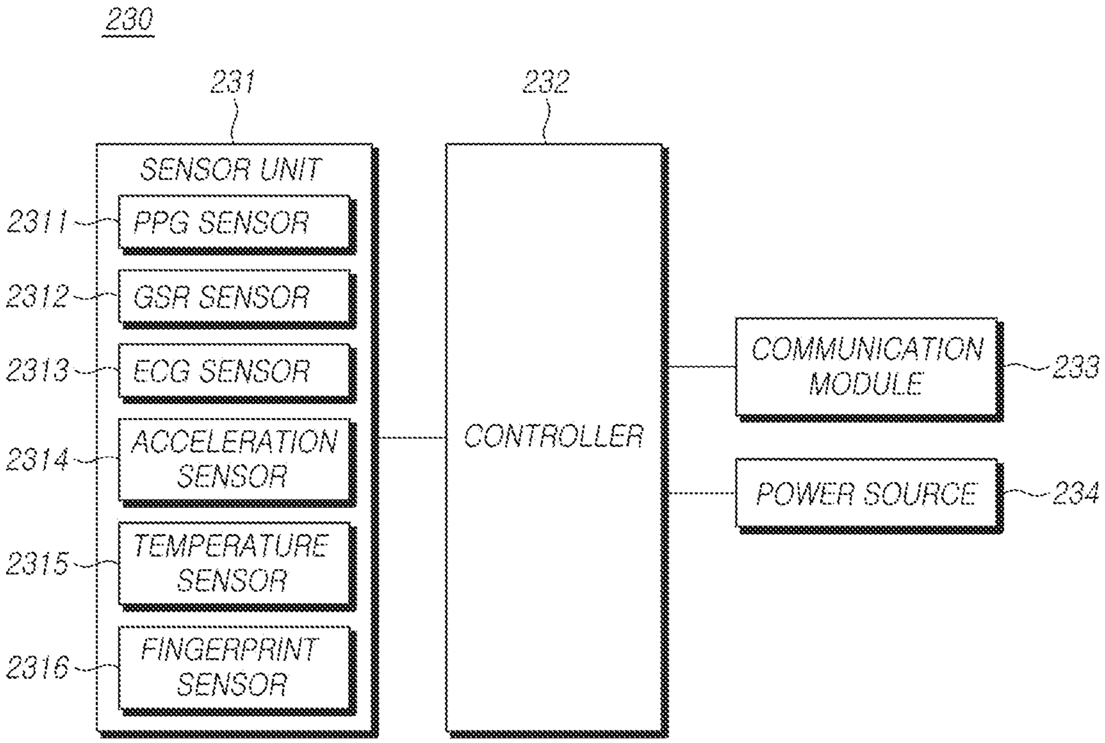
FIG. 3 is a functional block diagram illustrating a ring-shaped wearable electronic device according to an embodiment of the disclosure.

FIG. 3 is a functional block diagram illustrating a ring-shaped wearable electronic device according to an embodiment of the disclosure.

FIG. 3 is a block diagram illustrating a state in which a sensor unit 231, a power source 234, and a communication module 233 are electrically connected to a controller 232 according to an embodiment of the disclosure.

Referring to FIG. 3, the electronic component portion 230 according to an embodiment may include a sensor unit 231, a communication module 233, a power source 234, and a controller 232. In an embodiment of the disclosure, the electronic component portion 230 may include a plurality of printed circuit boards (PCBs), various sensors and electrical elements disposed on the PCBs, and a flexible printed circuit board (FPCB) for electrically connecting the plurality of printed circuit boards (PCBs arranged in a row to each other.

According to an embodiment of the disclosure, the sensor unit 231 may be configured to perform various functions. In an embodiment of the disclosure, the sensor unit 231 may perform a function of detecting whether the user has apnea during sleep, detecting whether the user is asleep and in which sleep stage, measuring blood pressure, measuring calorie consumption, measuring skin hydration, authenticating the user, and/or measuring temperature. In an embodiment of the disclosure, the sensor unit 231 may include at least one of various sensors to perform the above-described various functions.

According to an embodiment of the disclosure, the sensor unit 231 may include a photoplethysmography (PPG) sensor 2311 for detecting whether the user has sleep apnea. In an embodiment of the disclosure, the PPG sensor 2311 may measure the user's blood oxygen saturation to detect whether the user has sleep apnea.

According to an embodiment of the disclosure, the PPG sensor 2311 may include a light emitter (not shown) configured to emit light toward the user's body member (e.g., finger) when the user wears the wearable electronic device 200, and a light receiver (not shown) configured to receive light reflected from the blood vessel inside the user's body member (e.g, finger) among the light emitted from the light emitter. In an embodiment of the disclosure, the light emitter may include at least one light source. For example, the at least one light source may include at least one of a red light emitting diode (LED) or an infrared LED. In an embodiment of the disclosure, the light receiver may include at least one photodiode.

According to an embodiment of the disclosure, the sensor unit 231 may include a galvanic skin response sensor (GSR) 2312 for detecting a change in current due to moisture discharged from the skin of the user's member (e.g., finger). In an embodiment of the disclosure, the GSR sensor 2312 may be configured to detect a change in skin humidity due to the sympathetic nervous system of the body as a change in electrical resistance. In this case, the controller 232 may determine whether the current state of the user is in an awakened state or a drowsy state based on the change in the resistance of the GSR sensor 2312 corresponding to the change in the skin humidity and determine whether the user sleeps. For example, the controller 232 may determine whether the user is drowsy by simultaneously measuring the skin impedance response (SIR) corresponding to the alternating current (AC) component and the overall skin impedance level (SIL) corresponding to the direct current (DC) component, using the signal of the GSR sensor 2312. Specifically, when the user is dozing off, the expression interval of the SIR becomes longer, the expression frequency decreases, and the SIL increases.

According to an embodiment of the disclosure, the sensor unit 231 may include an electrocardiogram (ECG) sensor 2313. In an embodiment of the disclosure, the ECG sensor 2313 may be configured to measure the user's heartrate and consistency. In an embodiment of the disclosure, the ECG sensor 2313 may be used to check the size and position of the user's heart or whether the user's heart is damaged. For example, the ECG sensor 2313 may be used to measure and diagnose an abnormal rhythm of the heart. More particularly, the ECG sensor 2313 is effective in measuring an abnormal rhythm due to damage to conductive tissue that transmits an electrical signal.

According to an embodiment of the disclosure, the sensor unit 231 may include an acceleration sensor 2314 for detecting the user's movement. The acceleration sensor 2314 may correspond to, e.g., a three-axis acceleration sensor that measures acceleration in the X-axis, Y-axis, and Z-axis directions. In an embodiment of the disclosure, the acceleration sensor 2314 may be replaced by a gyro sensor (not shown) or may detect the user's movement in combination with the gyro sensor.

According to an embodiment of the disclosure, the sensor unit 231 may include a temperature sensor 2315 for detecting the user's body temperature or an object's temperature. In an embodiment of the disclosure, the temperature sensor 2315 may correspond to a contactless temperature sensor, but the disclosure is not limited thereto.

According to an embodiment of the disclosure, the sensor unit 231 may include a fingerprint sensor 2316 for detecting the user's fingerprint. The fingerprint sensor 2316 may be implemented by, e.g., an optical fingerprint recognition method, a capacitive fingerprint recognition method, or an ultrasonic fingerprint recognition method, but the disclosure is not limited thereto.

According to an embodiment of the disclosure, the controller 232 may be configured to perform the overall operation of the wearable electronic device 200.

In an embodiment of the disclosure, the controller 232 may measure the blood pressure of the user by using a known blood pressure estimation method based on the ECG signal detected by the ECG sensor 2313 and the blood oxygen saturation detected by the PPG sensor 2311.

In an embodiment of the disclosure, the controller 232 may measure the calorie consumption of the user based on the signal detected by the acceleration sensor 2314.

In an embodiment of the disclosure, the controller 232 may detect the sleep stage of the user by using the signal detected by the PPG sensor 2311 or the ECG sensor 2313 and the signal detected by the acceleration sensor 2314.

In an embodiment of the disclosure, the controller 232 may perform the user authentication function by using signals detected through the fingerprint sensor 2316 and the ECG sensor 2313. For example, the controller 232 may perform user authentication by comparing the detected fingerprint data and ECG data with the user's fingerprint data and ECG data previously stored in memory (not shown).

In an embodiment of the disclosure, the controller 232 may receive power from the power source 234 and may supply the received power to the sensor unit 231 or the communication module 233.

According to an embodiment of the disclosure, the communication module 233 may be configured to transmit various signals detected by the sensor unit 231 to an external device (e.g., the first external electronic device 102 of FIG. 1) or to receive signals transmitted from the first external device 102.

According to an embodiment of the disclosure, the communication module 233 may include an element that performs a wireless communication function of any one of Bluetooth, Wi-Fi, and Zigbee technologies. In an embodiment of the disclosure, the communication module 233 may include a near-field communication (NFC) chip for implementing a mobile payment function.

According to an embodiment of the disclosure, the power source 234 may include a battery (the battery 235 of FIG. 2B) and may be configured to supply power from the battery 235 to the controller 232. In an embodiment of the disclosure, the power source 234 may include a wireless charging circuit (not shown). In this case, the power source 234 may wirelessly receive power from a separate external wireless charging device (not shown) through the wireless charging circuit to charge the battery 235 with the power. However, the disclosure is not limited thereto, and the power source 234 may include a separate charging terminal (not shown), and may be electrically connected to the power terminal (not shown) of the separate external charger through the charging terminal to charge the battery 235 with the power in a wired charging manner.

Figure 4:
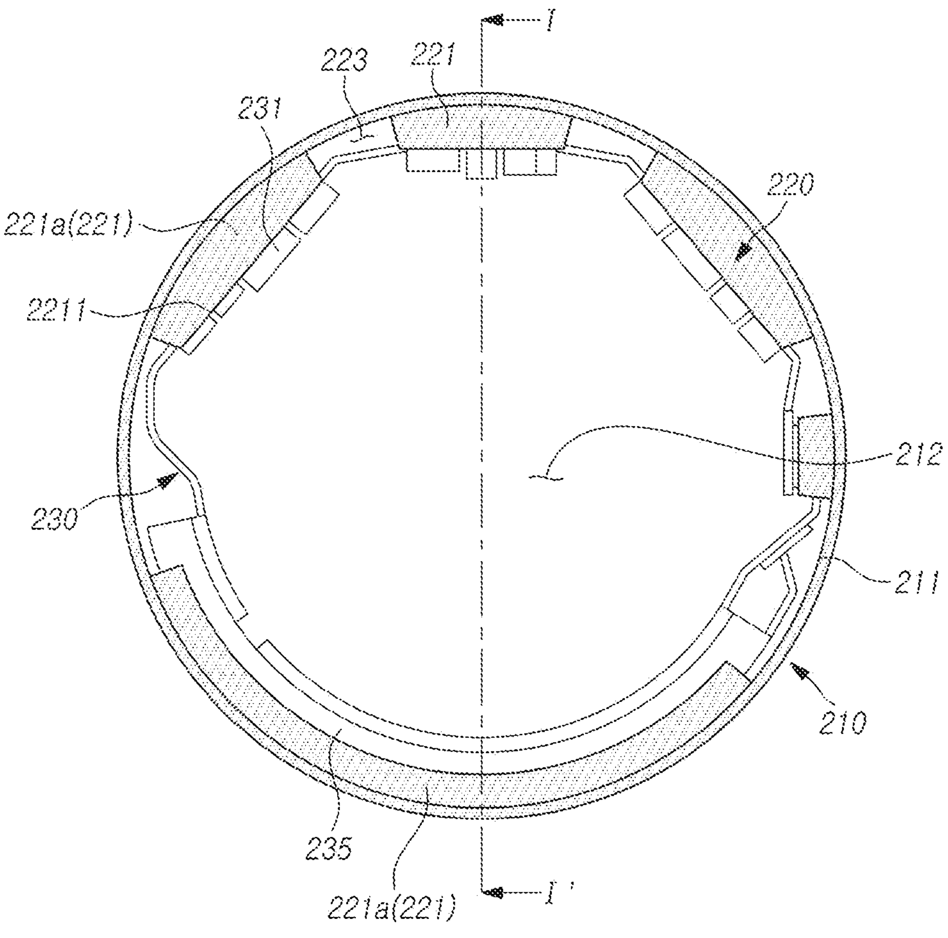
FIG. 4 is a plan view illustrating a state in which an electronic component portion fixed inside an outer frame according to an embodiment of the disclosure.
Figure 5:
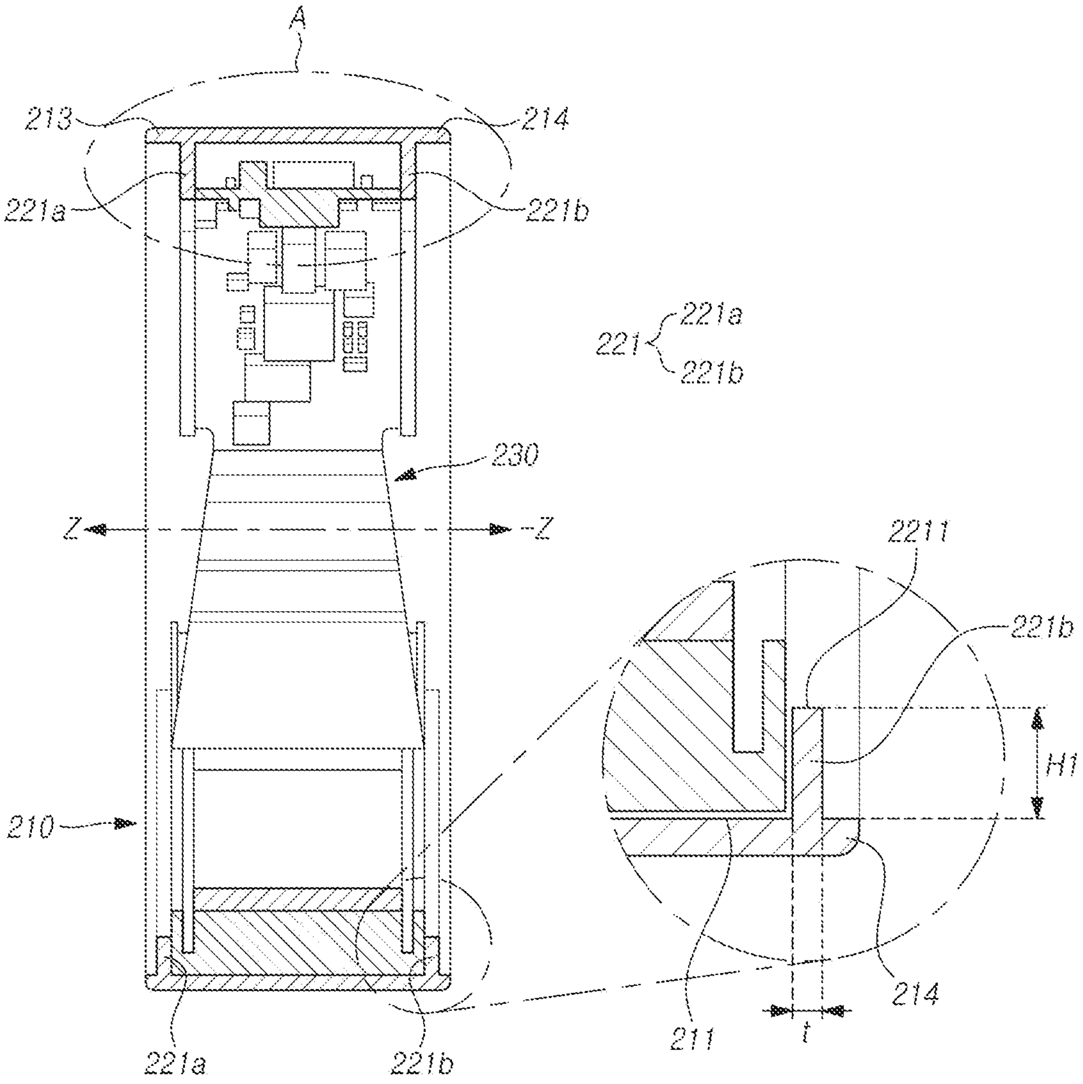
FIG. 5 is a cross-sectional view taken along line I-I' of FIG. 4 according to an embodiment of the disclosure.

FIG. 4 is a plan view illustrating a state in which an electronic component portion is fixed inside an outer frame according to an embodiment of the disclosure. FIG. 5 is a cross-sectional view taken along line I-I' of FIG. 4 according to an embodiment of the disclosure.

Referring to FIGS. 4 and 5, the fixing portion 220 of the wearable electronic device (e.g., the wearable electronic device 200 of FIG. 2C) according to an embodiment may include a plurality of rib pairs 221 protruding from the inner surface 211 of the outer frame 210 toward the inside of the hole 212, e.g., the center of the hole 212. In this case, as the rigidity of the outer frame 210 is reinforced by the plurality of rib pairs 221, deformation due to the load applied to the radially inner side of the outer frame 210 (e.g., the direction toward the inside of the hole 212 of the outer frame 210) may be reduced.

According to an embodiment of the disclosure, each of the plurality of rib pairs 221 may be disposed on the inner surface 211 of the outer frame 210 at different or varying positions. In an embodiment of the disclosure, the plurality of rib pairs 221 may be spaced apart from each other in the circumferential direction along the inner surface 211 of the outer frame 210 with a gap 223 (or interval). In this case, if the inner frame (e.g., the inner frame 240 of FIG. 2C) is integrally coupled to the outer frame 210 by an injection process or a molding process while the electronic component portion 230 is fixed by the fixing portion 220, the resin may smoothly fill the molds through the gap 223, thereby enhancing mass production of the product. Further, the resin filling the gap 223 may increase the coupling force of the inner frame 240 formed thereby to the outer frame 210, thereby preventing the inner frame 240 from falling off the outer frame 210 during subsequent use of the device. Here, the gap 223 may be referred to as a rib gap.

According to an embodiment of the disclosure, each of the rib pairs 221 may include two (2) ribs **221*a* and 221*b*. In an embodiment of the disclosure, the pair of ribs 221*a* and 221*b* may be spaced apart from each other along the extending direction (or upper and lower direction) (e.g., +Z axis direction or −Z axis direction) of the hole 212 formed inside the outer frame 210. In this case, a space (or a gap) in which at least a portion of the electronic component portion 230 is received may be formed between the pair of ribs 221*a* and 221*b*, and at least a portion of the electronic component portion 230 may be fixedly disposed between the pair of ribs 221***a* and 221*b* through the space (or the gap).

According to an embodiment of the disclosure, the pair of fixed ribs 221*a* and 221*b* may include a first rib 221*a* disposed on an upper side on the inner surface 211 (e.g., in the +Z-axis direction) and a second rib 221*b* disposed at a lower side on the inner surface 211 of the outer frame 210 (e.g., in the −Z-axis direction). In an embodiment of the disclosure, the first rib 221*a* and the second rib 221*b* may be substantially the same or similar in function, shape, and/or structure. In an embodiment of the disclosure, the description of any one of the ribs 221*a* and 221*b* may be equally applied to the other rib 221*a* and 221*b*. The first rib 221*a* may be referred to as an upper rib, and the second rib 221*b* may be referred to as a lower rib.

According to an embodiment of the disclosure, the pair of ribs 221*a* and 221*b* may be disposed to overlap each other. For example, the first rib 221*a* and the second rib 221*b* may be disposed to face each other. For example, when the outer frame 210 is viewed from thereabove (e.g., +Z axis), the first rib 221*a* and the second rib 221*b* may overlap each other to be recognized as one rib.

According to an embodiment of the disclosure, each of the pair of ribs 221*a* and 221*b* may be disposed to be spaced apart from each other from two opposite edges 213 and 214 of the outer frame 210 to the inside. In an embodiment of the disclosure, the first rib 221*a* may be disposed inside (e.g., a position spaced apart by a predetermined interval to the inside (e.g., in the −Z-axis direction) (e.g., the first direction) from an upper end (e.g., the edge in the +Z-axis direction) of the outer frame 210. For example, the first rib 221*a* may be located in an upper end portion adjacent to the upper end 213 of the outer frame 210. In an embodiment of the disclosure, the second rib 221*b* may be disposed inside (e.g., a position spaced apart by a predetermined interval in the +Z-axis direction (e.g., the second direction)) from a lower end (e.g., the edge in the −Z-axis direction) of the outer frame 210. For example, the second rib 221*b* may be located in a lower end portion adjacent to the lower end 214 of the outer frame 210.

According to an embodiment of the disclosure, each of the ribs 221*a* and 221*b* may protrude from the inner surface 211 of the outer frame 210 toward or in the direction of the inside of the hole 212, as described above. According to an embodiment of the disclosure, a free end 2211 of each of the ribs 221*a* and 221*b*, e.g., a portion protruding from the inner surface 211 of the outer frame 210 toward or in the direction of the center of the hole 212, may be formed to have a straight line or curved shape as necessary. In an embodiment of the disclosure, the pair of ribs 221*a* and 221*b* may have different shapes depending on, e.g., a partial shape (e.g., a circuit board shape) of the electronic component portion 230 disposed between the pair of ribs 221*a* and 221*b*. For example, if the portion of the electronic component portion 230 disposed between the pair of ribs 221*a* and 221*b* has a straight line shape, the free end 2211 of each of the pair of ribs 221*a* and 221*b* may be configured to form a straight line. For example, when the portion of the electronic component portion 230 disposed between the pair of ribs 221*a* and 221*b* has a curved shape, the free end 2211 of each of the pair of ribs 221*a* and 221*b* may be configured to form a curved shape.

According to an embodiment of the disclosure, each of the ribs 221*a* and 221*b* may protrude from the inner surface 211 of the outer frame 210 to have a predetermined height H1. In an embodiment of the disclosure, the height H1 of the ribs 221*a* and 221*b* may be a distance between the free end 2211 of the ribs 221*a* and 221*b* and the inner surface 211. In an embodiment of the disclosure, the height H1 of the ribs 221*a* and 221*b* may be designed to surround a portion of the electronic component portion 230 disposed between the ribs 221*a* and 221*b*. In an embodiment of the disclosure, the ribs 221*a* and 221*b* may have a height H1 sufficient to stably fix the portion of the electronic component portion 230 disposed between the ribs 221*a* and 221*b*. According to an embodiment of the disclosure, when a predetermined circuit board of the electronic component portion 230 is disposed between the pair of ribs 221*a* and 221*b*, the pair of ribs 221*a* and 221*b* may be disposed to be spaced apart from each other along the Z-axis direction to have a distance equal to or greater than the length along the Z-axis direction of the corresponding circuit board. Further, in an embodiment of the disclosure, each of the pair of ribs 221*a* and 221*b* may have a predetermined appropriate thickness t for rigidity and light weight. For example, each of the pair of ribs 221*a* and 221*b* may be designed to have a thickness t of 0.2 mm or more.

Figure 6A:
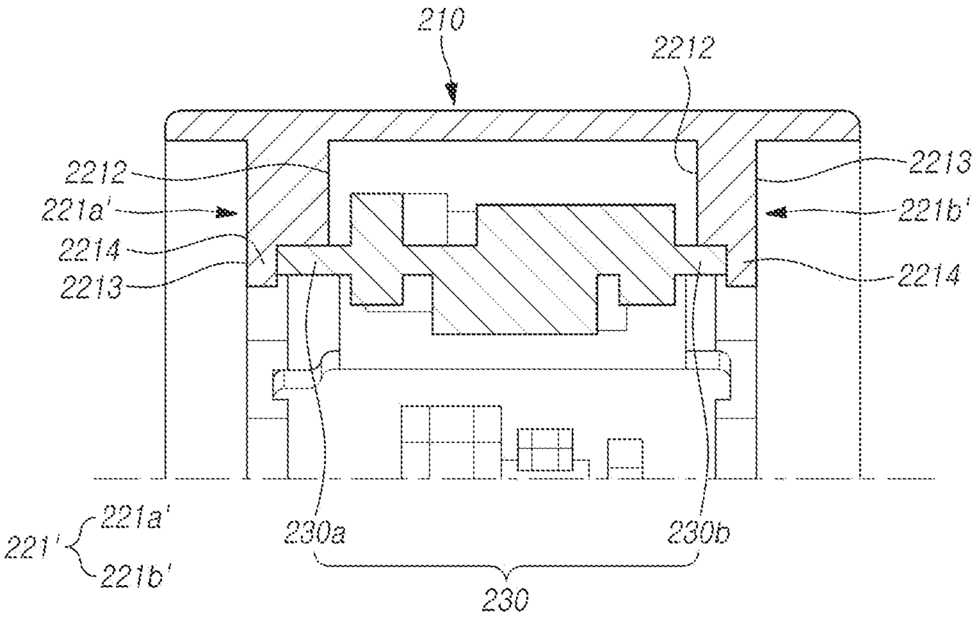
FIG. 6A is an enlarged view illustrating a modified example of part A of FIG. 5 according to an embodiment of the disclosure.
Figure 6B:
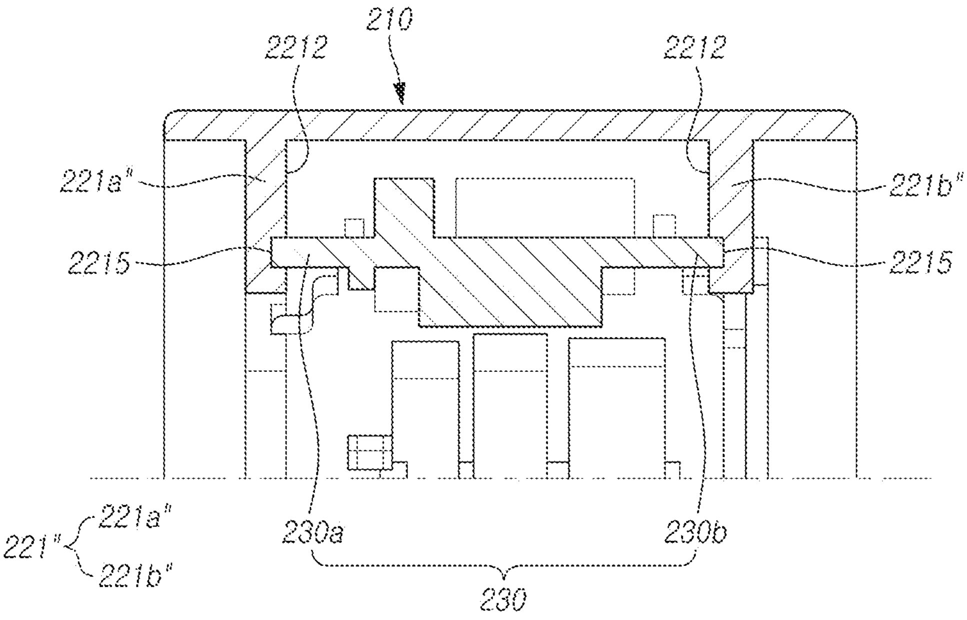
FIG. 6B is an enlarged view illustrating a modified example of part A of FIG. 5 according to an embodiment of the disclosure.
Figure 6C:
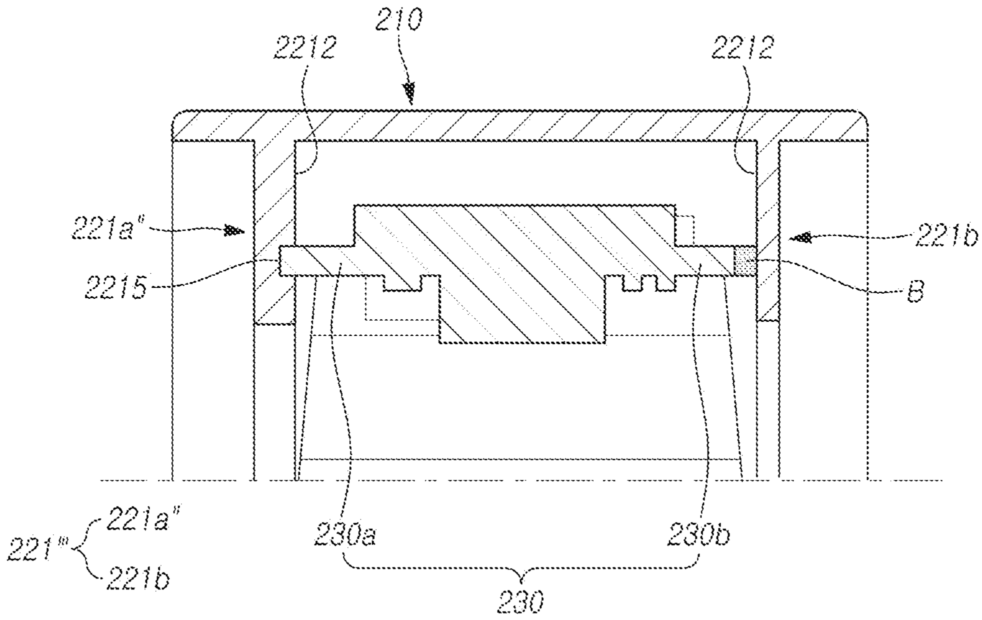
FIG. 6C is an enlarged view illustrating a modified example of part A of FIG. 5 according to an embodiment of the disclosure.

FIG. 6A is an enlarged view illustrating a modified example of part A of FIG. 5 according to an embodiment of the disclosure. FIG. 6B is an enlarged view illustrating a modified example of part A of FIG. 5 according to an embodiment of the disclosure. FIG. 6C is an enlarged view illustrating a modified example of part A of FIG. 5 according to an embodiment of the disclosure.

Specifically, FIG. 6A is a view illustrating a state in which, in an embodiment of the disclosure, the electronic component portion 230 is press-fitted into a fixing portion (e.g., the fixing portion 220 of FIG. 4) through a seating portion 2214 having a step structure provided on each of the pair of ribs 221'.

Referring to FIG. 6A, each of the pair of ribs 221*a*' and 221*b*' of the fixing portion 220 according to an embodiment may include a seating portion 2214 having a step structure (e.g., difference in surface level) on one surface 2212 facing the other rib 221*a*' or 221*b*' paired therewith. In an embodiment of the disclosure, the seating portion 2214 may be positioned at the free end of each of the pair of ribs 221*a*' and 221*b*'. In an embodiment of the disclosure, the seating portion 2214 may be recessed from one surface 2212 of each of the pair of ribs 221*a*' and 221*b*'. In this case, when the electronic component portion 230 is assembled into the outer frame 210, each of two opposite ends 230*a* and 230*b* of the electronic component portion 230 may be press-fitted into the fixing portion 220 (or the space between the ribs 221*a*' and 221*b*') while contacting the seating portion 2214 having a step structure, provided on each of the pair of ribs 221*a*' and 221*b*'.

FIG. 6B is a view illustrating a state in which the electronic component portion 230 is press-fitted into the fixing portion 220 through a recess 2215 provided in each of the pair of ribs 221" in an embodiment.

Referring to FIG. 6B, each of the pair of ribs 221*a* and 221*b*" of the fixing portion 220 according to an embodiment may have a recess 2215 formed in one surface 2212 facing the other rib 221*a* or 221*b*" paired therewith. In an embodiment of the disclosure, the recess 2215 may be formed to be spaced apart from the free end of each of the pair of ribs 221*a* and 221*b*" toward the inner surface 211 of the outer frame 210 by a predetermined distance. In this case, when the electronic component portion 230 is assembled to the outer frame 210, the electronic component portion 230 may be press-fitted into the fixing portion 220 as each of two opposite ends 230*a* and 230*b* of the electronic component portion 230 is inserted into the recess 2215 of each of the pair of ribs 221*a* and 221*b"*.

FIG. 6C is a view illustrating a state in which, in an embodiment of the disclosure, one end 230*a* of the electronic component portion 230 is fixed to the rib 221*a*" through the recess 2215 provided in one rib 221*a*" of the pair of ribs 221" and the other end 230*b* of the electronic component portion 230 is fixed to the other rib 221*b* by an adhesive member B.

Referring to FIG. 6C, any one rib 221*a*" of the pair of ribs 221" of the fixing portion 220 according to an embodiment may have a recess 2215 formed in one surface 2212 facing the other rib 221*b* as shown in FIG. 6B, and no recess may be provided in one surface 2212 of the other rib 221*b*.

In this case, when the electronic component portion 230 is assembled into the outer frame 210, one end 230*a* of the electronic component portion 230 may be inserted and fixed to the recess 2215 provided in any one rib 221*a*" of the pair of ribs 221'", and the other end 230*b* of the electronic component portion 230 may be fixed to the other rib 221*b* through an adhesive member B, such as a tape.

As described above with reference to FIGS. 6A to 6C, each of the pair of ribs 221*a* and 221*b* may fix the electronic component portion 230 to the outer frame 210 by one of the step structure, the recess structure, or the adhesive member B, or a combination thereof. Each of the fixing structures illustrated in FIGS. 6A to 6C is merely an example, but the disclosure is not limited thereto.

Figure 7:
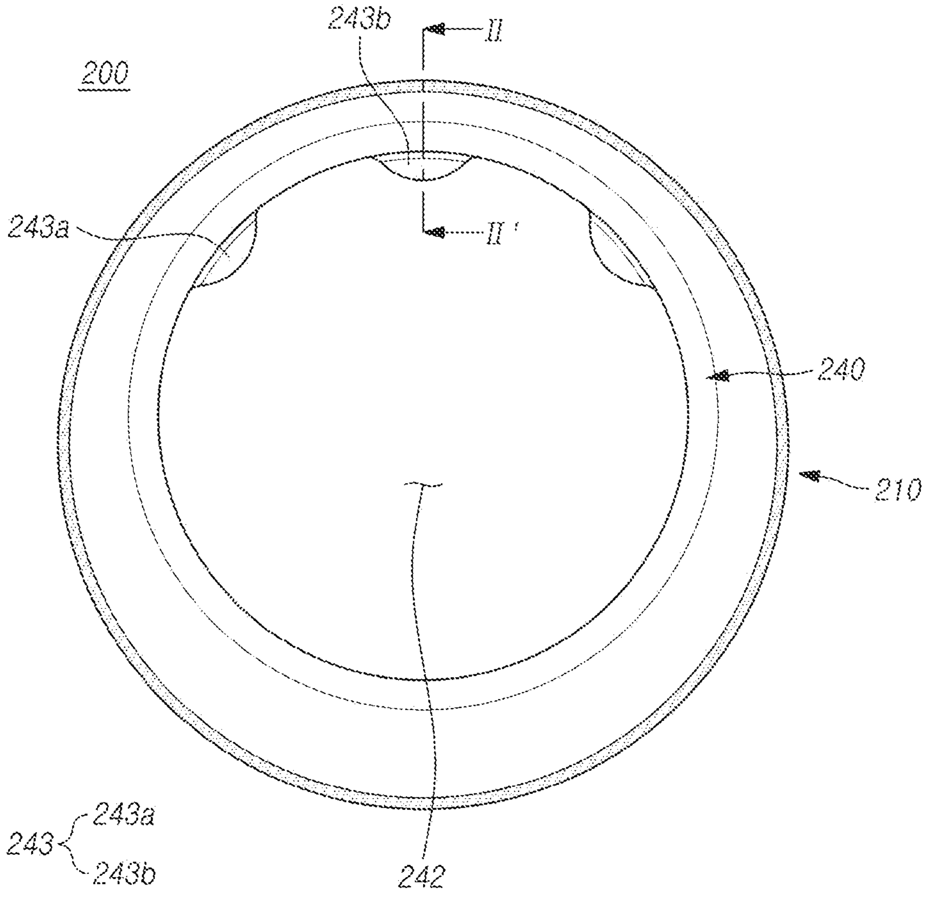
FIG. 7 is a plan view illustrating a ring-shaped wearable electronic device according to an embodiment of the disclosure.
Figure 8A:
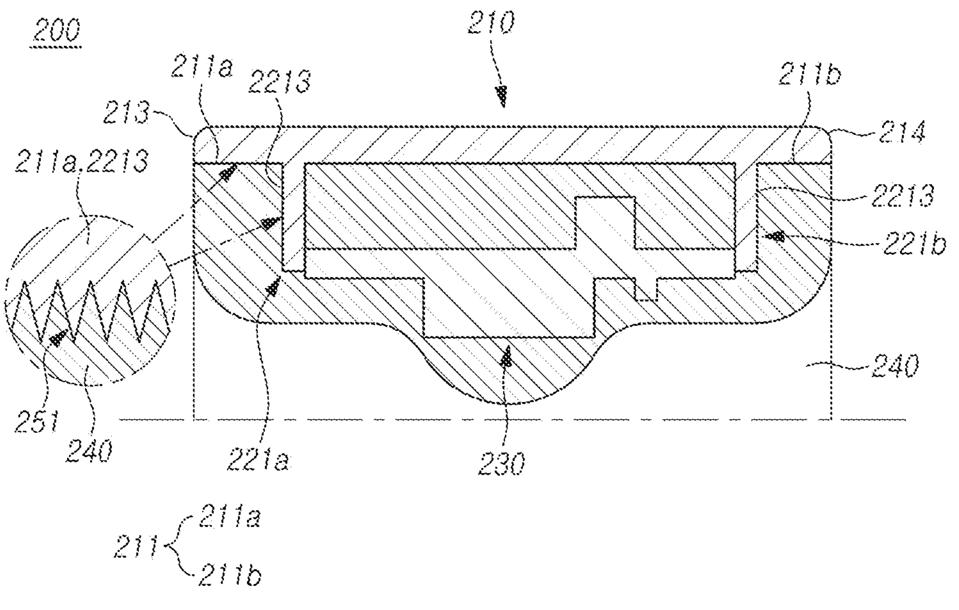
FIG. 8A is a partial cross-sectional view illustrating a wearable electronic device, taken along line II-II' of FIG. 7 according to an embodiment of the disclosure.
Figure 8B:
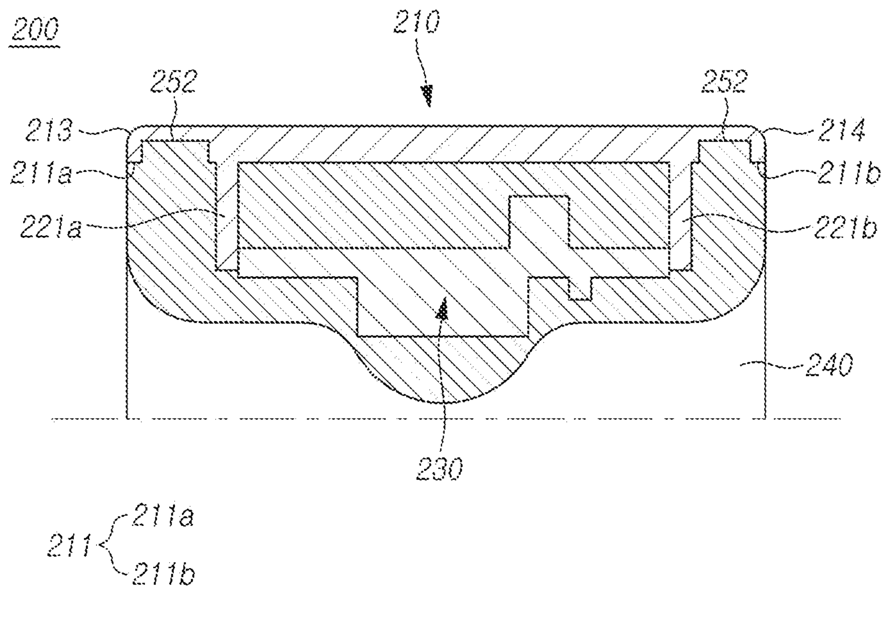
FIG. 8B is a partial cross-sectional view illustrating a wearable electronic device, taken along line II-II' of FIG. 7 according to an embodiment of the disclosure.
Figure 8C:
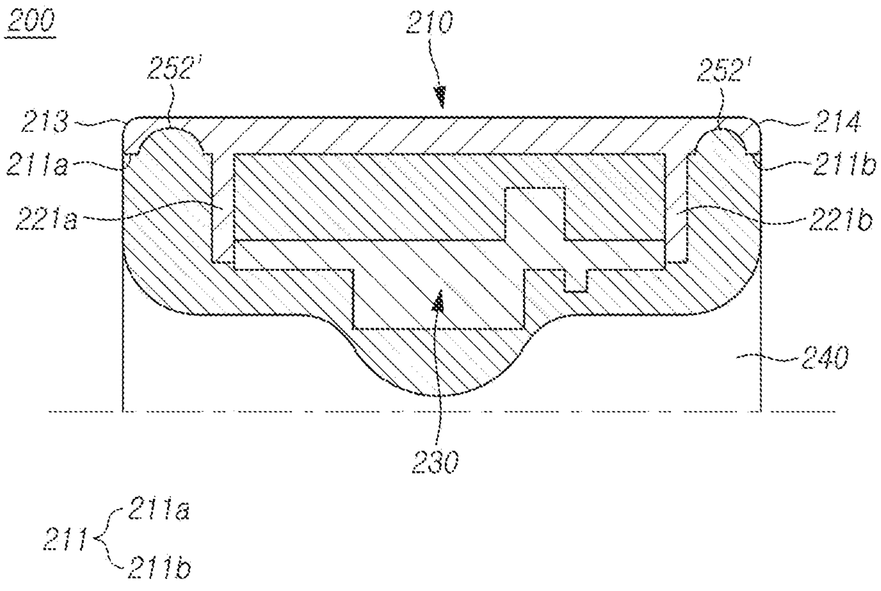
FIG. 8C is a partial cross-sectional view illustrating a wearable electronic device, taken along line II-II' of FIG. 7 according to an embodiment of the disclosure.
Figure 8D:
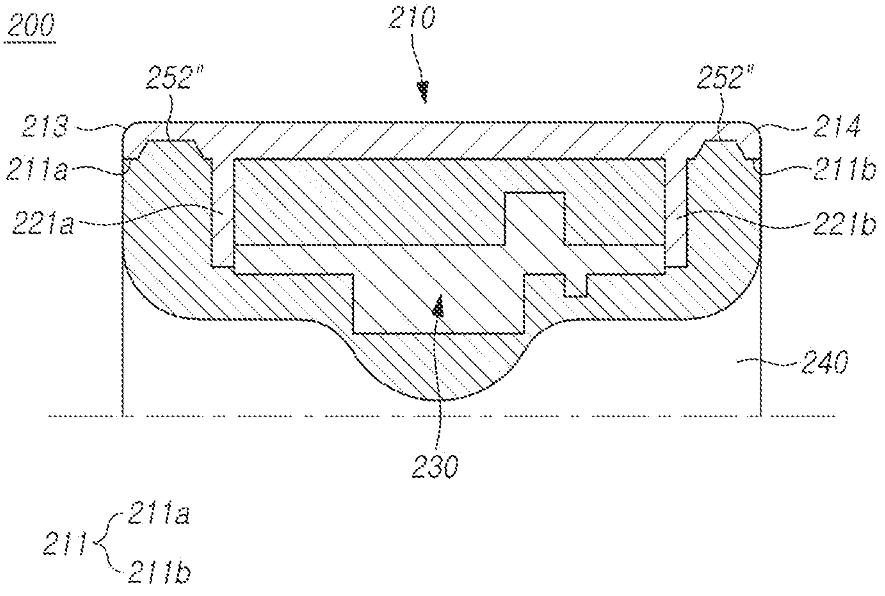
FIG. 8D is a partial cross-sectional view illustrating a wearable electronic device, taken along line II-II' of FIG. 7 according to an embodiment of the disclosure.

FIG. 7 is a plan view illustrating a ring-shaped wearable electronic device according to an embodiment of the disclosure. FIG. 8A is a partial cross-sectional view illustrating a wearable electronic device, taken along line II-II' of FIG. 7 according to an embodiment of the disclosure. FIG. 8B is a partial cross-sectional view illustrating a wearable electronic device, taken along line II-II' of FIG. 7 according to an embodiment of the disclosure. FIG. 8C is a partial cross-sectional view illustrating a wearable electronic device, taken along line II-II' of FIG. 7 according to an embodiment of the disclosure. FIG. 8D is a partial cross-sectional view illustrating a wearable electronic device, taken along line II-II' of FIG. 7 according to an embodiment of the disclosure.

Referring to FIG. 7, FIGS. 8A, 8B, 8C, and 8D, in some embodiments of the disclosure, on one outward surface 2213 of each rib 221*a* or 221*b* (e.g., one surface disposed outward rather than toward the paired counterpart rib 221*b* or 221*a*) and/or one surface 211*a* or 211*b* of the outer frame 210 adjacent to the one surface 2213 and connected to the edges 213 and 214 of the outer frame 210 may be provided a bonding reinforcing portion 251, 252, 251', or 252" for enhancing the coupling force between the outer frame 210 and the inner frame.

Specifically, FIG. 8A is a view illustrating a bonding reinforcing portion 251 having an irregularity pattern for enhancing the coupling force between the outer frame 210 and the inner frame 240 when, e.g., the inner frame 240 is coupled to the outer frame 210 by an injection process or a molding process. FIGS. 8B to 8D are views illustrating a bonding reinforcing portion 252, 252', or 252" having a recess structure for enhancing the coupling force between the outer frame 210 and the inner frame 240 when, e.g., the inner frame 240 is coupled to the outer frame 210 by an injection process or a molding process.

Referring to FIG. 8A, the bonding reinforcing portion 251 according to an embodiment may be provided to have an irregularity pattern on each of, e.g., one surface 2213 facing the outside of the rib 221*a* (e.g., one surface disposed outward, rather than toward the paired counterpart rib 221*b*) and/or one surface 211*a* near the edge 213 of the outer frame 210 and adjacent to the one surface 2213 and connected to the edge 213 of the outer frame 210. In this drawing, the bonding reinforcing portion 251 having an irregularity pattern is formed, at each of two opposite sides, on one surface 2213 of the rib 221*a* and one surface 211*a* of the outer frame 210, but the disclosure is not limited thereto. In an embodiment of the disclosure, the bonding reinforcing portion 251 may be selectively formed on one of the one surface 2213 of the rib 221*a* or the one surface 211*a* extending from the edge 213 of the outer frame 210. In another embodiment of the disclosure, the bonding reinforcing portion 251 may be formed on one surface 2213 facing the outside of the opposite rib 221*b* and/or one surface 211*b* of the outer frame 210 adjacent thereto, but the disclosure is not limited to a specific form.

As the bonding reinforcing portion 251 having an irregularity pattern is provided on the inner surface 211*a* or 211*b* of the outer frame 210 corresponding to the bonding boundary between the outer frame 210 and the inner frame 240 which has relatively weak bonding force as it is exposed outside the wearable electronic device 200, the contact area between the outer frame 210 and the inner frame 240 may increase, enhancing the coupling force between the outer frame 210 and the inner frame 240. Further, as the bonding reinforcing portion 251 having the irregularity pattern is provided on the outer surface 2213 of each of the ribs 221*a* and 221*b*, the coupling force between the outer frame 210 and the inner frame 240 may be further enhanced.

According to an embodiment of the disclosure, the bonding reinforcing portion 251 may be formed by a physical processing method (e.g., laser processing or milling) or may be implemented by a chemical processing method (e.g., etching).

Referring to FIGS. 8B to 8D, the bonding reinforcing portions 252, 252', and 252" according to an embodiment may be implemented in the form of recesses in the surfaces 211*a* and 211*b* positioned between the two opposite edges 213 and 214 of the outer frame 210 and the pair of ribs 221*a* and 221*b*, respectively.

According to an embodiment of the disclosure, referring to FIG. 8B, the bonding reinforcing portions 252 may be recessed from the inner surfaces 211*a* and 211*b* of the outer frame 210 positioned between the edges 213 and 214 of the outer frame 210 and the pair of ribs 221*a* and 221*b* to have a rectangular cross section.

According to an embodiment of the disclosure, referring to FIG. 8C, the bonding reinforcing portions 252' may be recessed from the inner surfaces 211*a* and 211*b* of the outer frame 210 positioned between the edges 213 and 214 of the outer frame 210 and the pair of ribs 221*a* and 221*b* to have a semi-circular cross section.

According to an embodiment of the disclosure, referring to FIG. 8D, the bonding reinforcing portions 252" may be recessed from the inner surfaces 211*a* and 211*b* of the outer frame 210 positioned between the edges 213 and 214 of the outer frame 210 and the pair of ribs 221*a* and 221*b* to have a trapezoidal cross section.

In this case, as the bonding reinforcing portion 252, 252', or 252" having a recess structure is provided on the inner surface 211*a* or 211*b* of the outer frame 210 corresponding to the bonding boundary between the outer frame 210 and the inner frame 240 which has relatively weak bonding force as it is exposed outside the wearable electronic device 200, the contact area between the outer frame 210 and the inner frame 240 may increase, enhancing the coupling force between the outer frame 210 and the inner frame 240. Referring to FIGS. 8B to 8D, it is illustrated that the bonding reinforcing portions 252, 252', and 252" are formed on the surfaces 211*a* and 211*b* positioned between the two opposite edges 213 and 214 of the outer frame 210 and the pair of ribs 221*a* and 221*b*, but the disclosure is not limited thereto. In an embodiment of the disclosure, various types of bonding reinforcing portions may also be formed on one surface (e.g., the one surface 2213 of FIG. 8A) of the ribs 221*a* and 221*b* close to the surfaces 211*a* and 211*b* of the outer frame 210.

Figure 9:
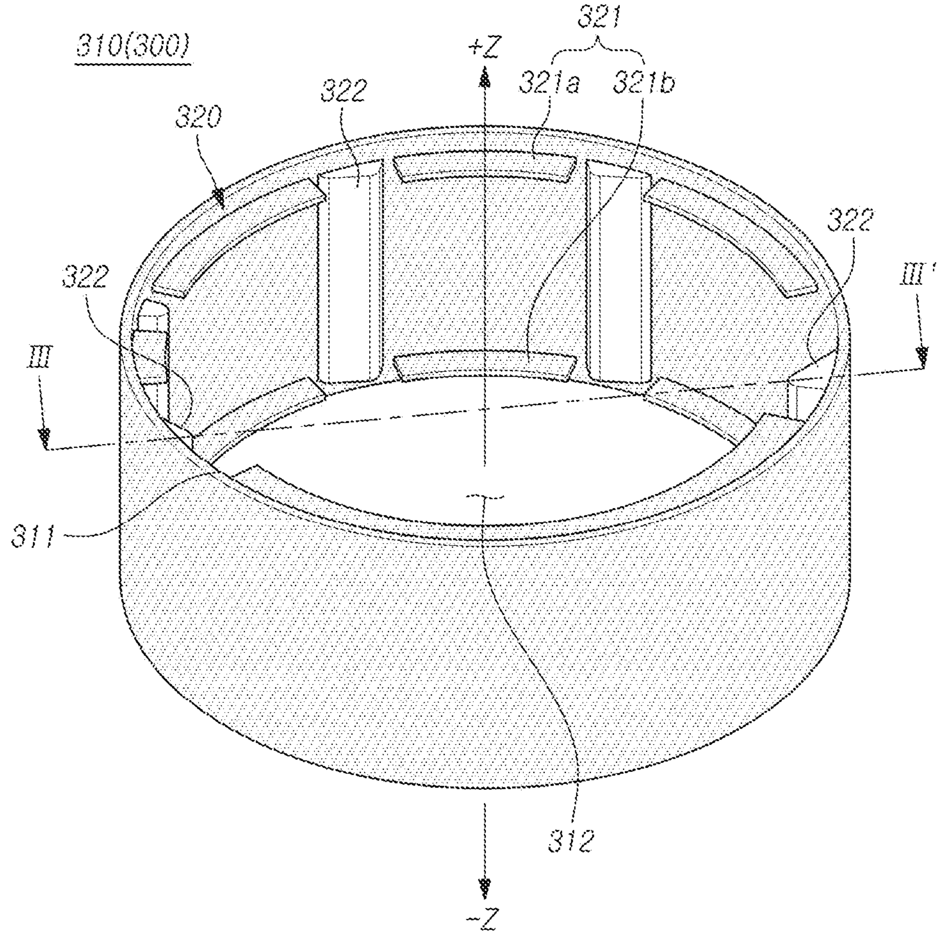
FIG. 9 is a perspective view illustrating an outer frame and a fixing portion installed on the outer frame in a ring-shaped wearable electronic device according to an embodiment of the disclosure.
Figure 10:
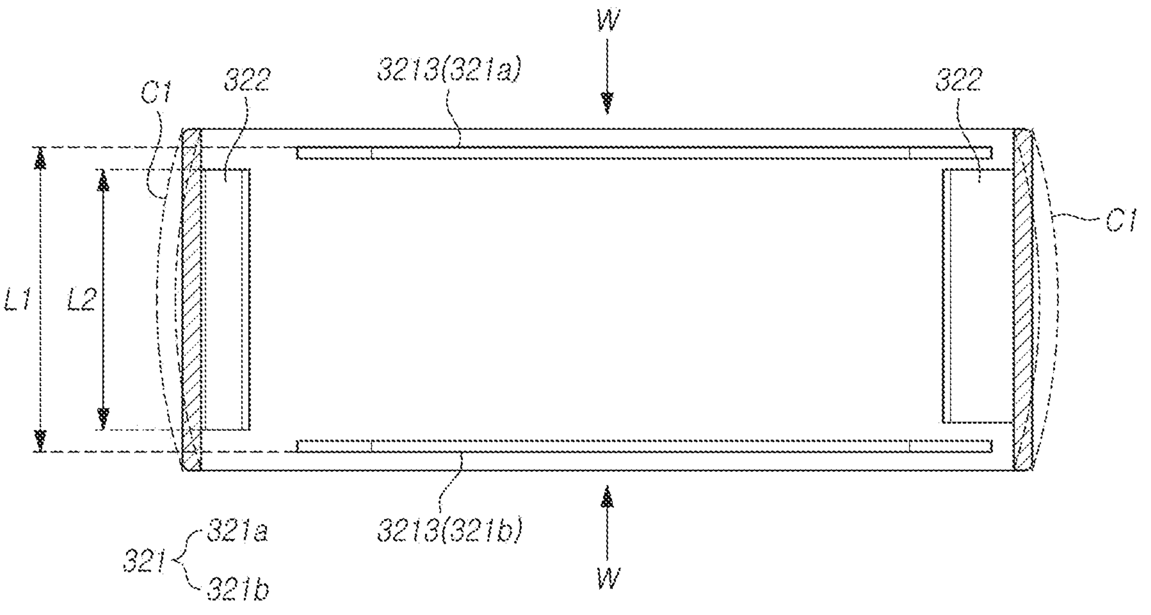
FIG. 10 is a cross-sectional view taken along line III-III' of FIG. 9 according to an embodiment of the disclosure.

FIG. 9 is a perspective view illustrating an outer frame and a fixing portion installed on the outer frame in a ring-shaped wearable electronic device according to an embodiment of the disclosure. FIG. 10 is a cross-sectional view taken along line III-III' of FIG. 9 according to an embodiment of the disclosure.

Since the outer frame 310 and a fixing portion 320 of the wearable electronic device 300 according to the embodiment illustrated in FIGS. 9 and 10 are substantially the same as or similar to the outer frame 210 and the fixing portion 220 of the wearable electronic device 200 according to the embodiment illustrated in FIG. 2A in terms of function, shape, and/or structure, descriptions of the outer frame 210 and the fixing portion 220 of the wearable electronic device 200 illustrated in FIG. 2A may be equally applied, and for convenience of description, descriptions of the same or corresponding portions will be omitted.

Referring to FIGS. 9 and 10, in an embodiment of the disclosure, at least one first reinforcing portion 322 may be provided on the inner surface 311 of the wearable electronic device 300 according to an embodiment to prevent deformation of the outer frame 310 (e.g., deformation of the outer frame 310 radially outward, as in area C1 illustrated in FIG. 10) due to the load W applied in the extending direction (e.g., ±Z-axis direction) of the hole 312 of the outer frame 310.

According to an embodiment of the disclosure, the first reinforcing portion 322 may be disposed between a plurality of rib pairs 321 formed on the inner surface 311 of the outer frame 310.

According to an embodiment of the disclosure, the first reinforcing portion 322 may protrude from the inner surface 311 of the outer frame 310 toward the inside of the hole 312 of the outer frame 310. In an embodiment of the disclosure, the height of the first reinforcing portion 322 protruding toward the inside of the hole 312 of the outer frame 310 may be set to be substantially the same as or smaller than the height of each of the ribs 321*a* and 321*b* of the rib pair 321 adjacent to the first reinforcing portion 322 with respect to the inner surface 311 of the outer frame 310.

According to an embodiment of the disclosure, the first reinforcing portion 322 may extend along the inner surface 311 of the outer frame 310 by a predetermined length L2 in the extending direction (e.g., the ±Z-axis direction) of the hole 312 of the outer frame 310. In an embodiment of the disclosure, the extension length L2 of the first reinforcing portion 322 may be designed to be shorter than the distance L1 between respective outer surfaces 3213 of the pair of ribs 321*a* and 321*b*. According to this design, when the fixing portion 320 of the outer frame 310 is processed, it is possible to enhance workability by preventing interference between the tool and the first reinforcing portion 322.

Figure 11:
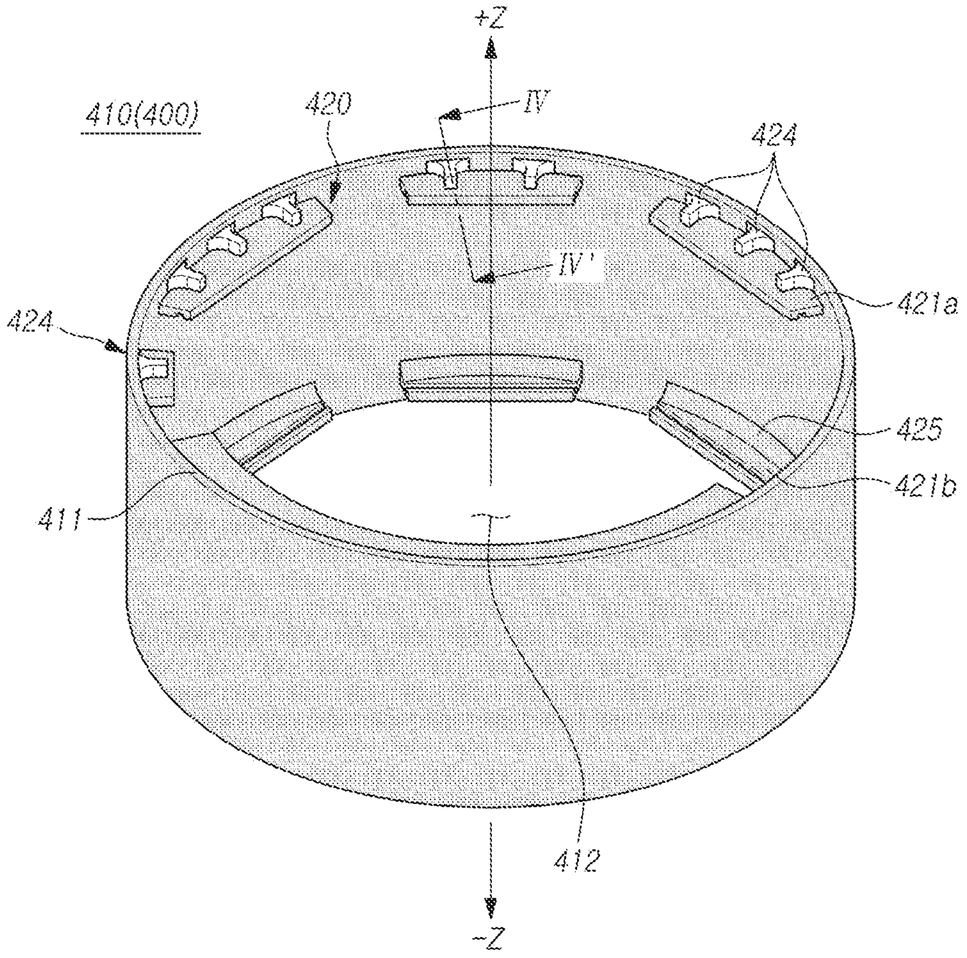
FIG. 11 is a perspective view illustrating an outer frame and a fixing portion installed on the outer frame in a ring-shaped wearable electronic device according to an embodiment of the disclosure.
Figure 12:
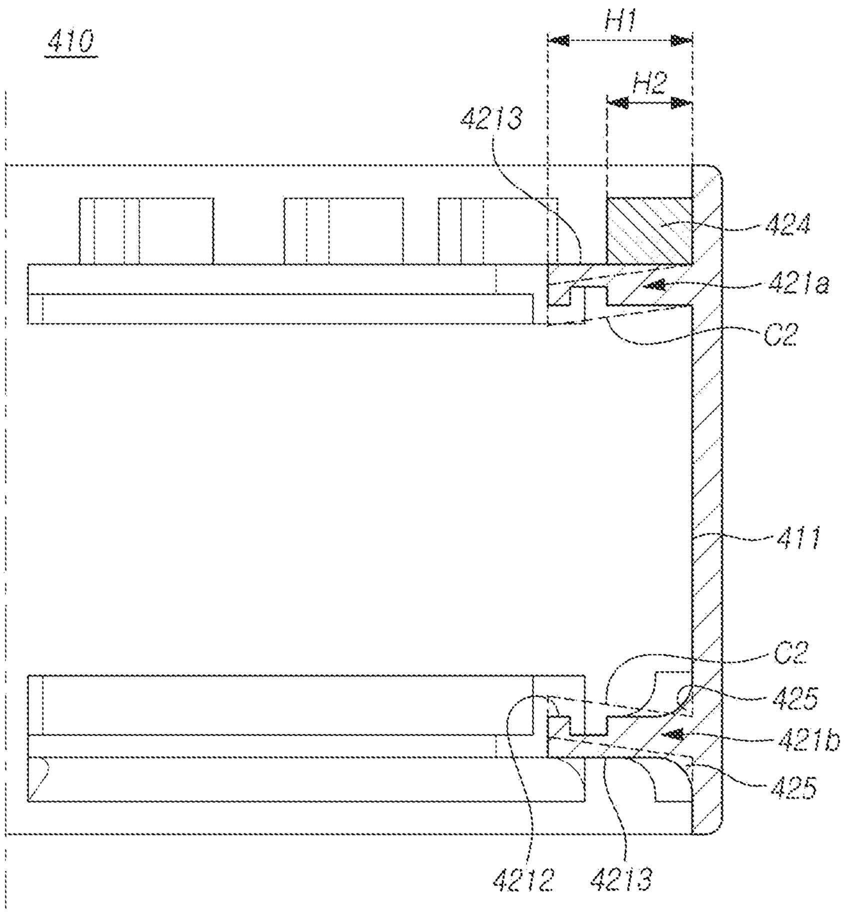
FIG. 12 is a cross-sectional view taken along line IV-IV' of FIG. 11 according to an embodiment of the disclosure.

FIG. 11 is a perspective view illustrating an outer frame and a fixing portion installed on the outer frame in a ring-shaped wearable electronic device according to an embodiment of the disclosure. FIG. 12 is a cross-sectional view taken along line IV-IV' of FIG. 11 according to an embodiment of the disclosure.

Since an outer frame 410 and the fixing portion 420 of a wearable electronic device 400 according to the embodiment illustrated in FIGS. 11 and 12 are substantially the same as or similar to the outer frame 210 and the fixing portion 220 of the wearable electronic device 200 according to the embodiment illustrated in FIG. 2A in terms of function, shape, and/or structure, descriptions of the outer frame 210 and the fixing portion 220 of the wearable electronic device 200 illustrated in FIG. 2A may be equally applied, and for convenience of description, descriptions of the same or corresponding portions will be omitted.

Referring to FIGS. 11 and 12, the wearable electronic device 400 according to an embodiment may include at least one second reinforcing portion 424 and 425 for preventing the fixing portion 420 from sagging.

According to an embodiment of the disclosure, the at least one second reinforcing portion 424 may be disposed to contact an outer surface 4213 (e.g., a surface facing the outside along the Z-axis direction) of at least one of the pair of ribs 421*a* and 421*b* constituting the fixing portion 420. In an embodiment of the disclosure, the second reinforcing portion 424 may protrude from an inner surface 411 of the outer frame 410 toward the center or inside of the hole 412 of the outer frame 410. In an embodiment of the disclosure, the protruding length H2 of the second reinforcing portion 424 may be designed to be substantially the same as or smaller than the protruding length H1 of the corresponding rib 421*a* or 421*b*.

According to an embodiment of the disclosure, the second reinforcing portion 425 may be configured to connect the inner surface 411 of the outer frame 410 to at least one of the pair of ribs 421*a* and 421*b*. For example, in an embodiment of the disclosure, the second reinforcing portion 425 may connect the inner surface 411 of the outer frame 410 with an inner surface 4212 (e.g., a surface facing the other rib) of the corresponding rib 421*a* or 421*b*. In an embodiment of the disclosure, the second reinforcing portion 425 may connect the inner surface 411 of the outer frame 410 with the outer surface 4213 (e.g., the surface opposite to the surface facing the other rib) of the corresponding rib 421*a* or 421*b*. In an embodiment of the disclosure, the second reinforcing portion 425 may extend obliquely from two opposite sides toward the outer surface 4213 and the inner surface 4212, respectively, of the corresponding rib 421*a* and 421*b*. In an embodiment of the disclosure, the second reinforcing portion 425 may be provided in the form of an inclined surface having a predetermined curvature. According to such a design, each of the ribs 421*a* and 421*b* may be prevented from being deformed by a load (e.g., sagging toward the ground, such as area C2 illustrated in FIG. 12).

Figure 13:
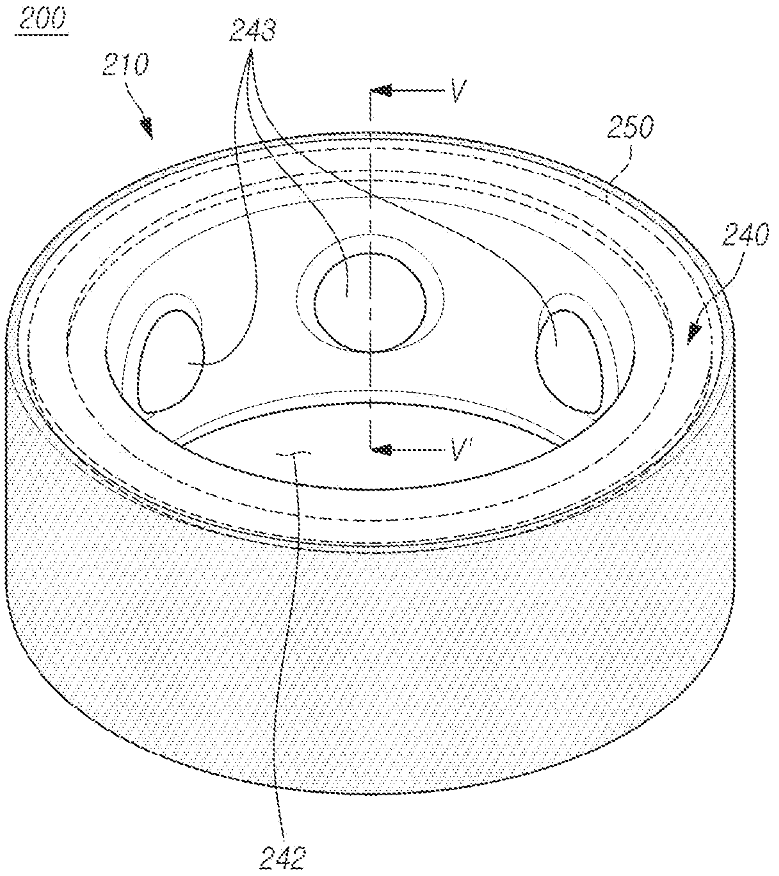
FIG. 13 is a perspective view illustrating a wearable electronic device including a decoration member according to an embodiment of the disclosure.
Figure 14:
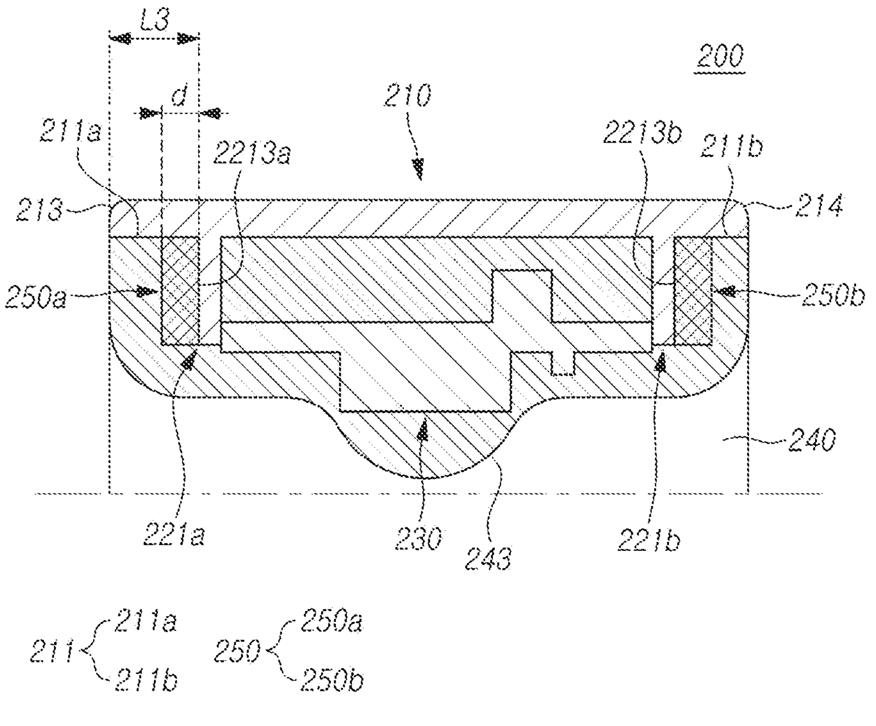
FIG. 14 is a cross-sectional view taken along line V-V' of FIG. 13 according to an embodiment of the disclosure.
Figure 15:
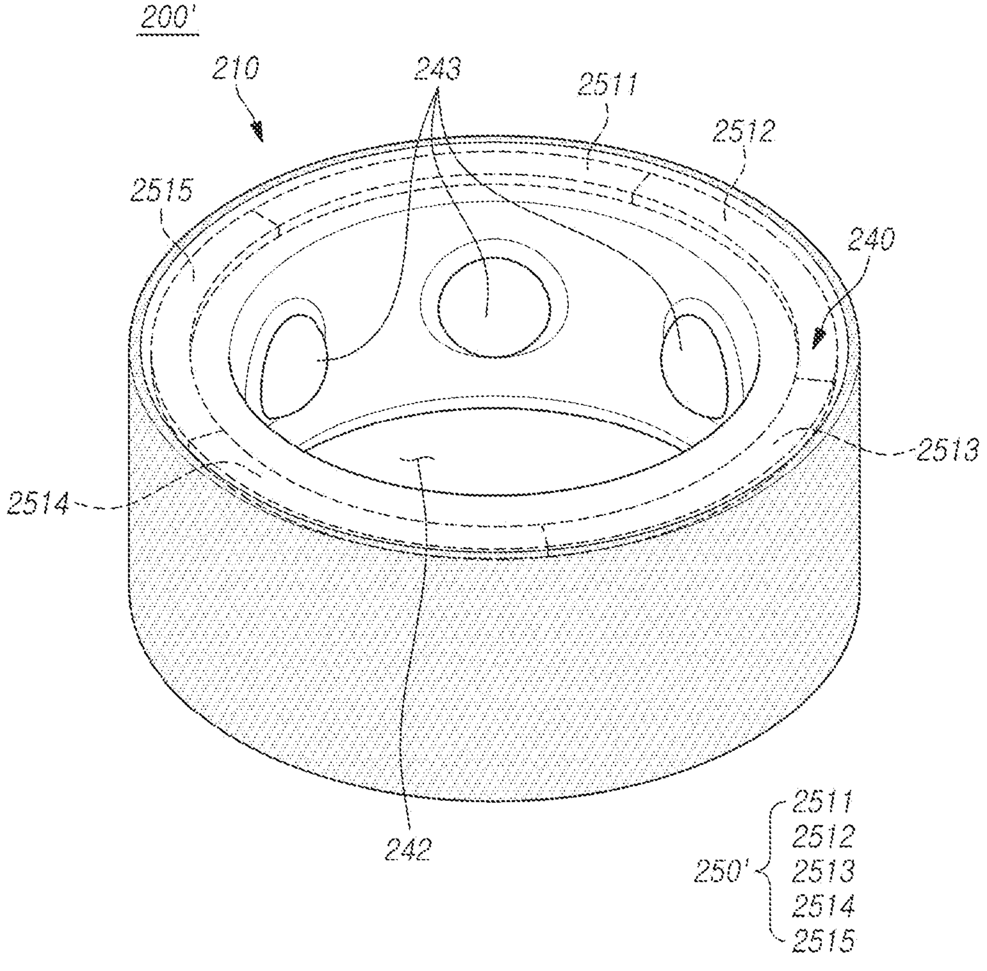
FIG. 15 is a perspective view illustrating an electronic device including a decoration member according to an embodiment of the disclosure.

FIG. 13 is a perspective view illustrating a wearable electronic device including a decoration member according to an embodiment of the disclosure. FIG. 14 is a cross-sectional view taken along line V-V' of FIG. 13 according to an embodiment of the disclosure. FIG. 15 is a perspective view illustrating an electronic device including a decoration member according to an embodiment of the disclosure.

In each of FIGS. 13 and 15, decoration members 250 and 250' according to an embodiment are shown in dashed lines.

Referring to FIGS. 13 and 14, the electronic device 200 according to an embodiment may include a decoration member 250 that blocks internal components (e.g., the electronic component portion 230) of the electronic device 200 from being viewed from the outside.

According to an embodiment of the disclosure, the decoration member 250 may overall have a ring shape.

According to an embodiment of the disclosure, the decoration member 250 may be disposed to overlap a fixing portion (e.g., the fixing portion 220 of FIG. 2A). In an embodiment of the disclosure, the decoration member 250 may be disposed to contact the inner surface 211 of the outer frame 210 and the fixing portion 220.

According to an embodiment of the disclosure, the decoration member 250 may include a first decoration member 250*a* positioned adjacent to the upper end 213 of the outer frame 210 and disposed to contact the inner surface 211*a* of the outer frame 210 and/or the outer surface 2213*a* of the first rib 221*a*, and a second decoration member 250*b* positioned adjacent to the lower end 214 of the outer frame 210 and disposed to contact the inner surface 211*b* of the outer frame 210 and/or the outer surface 2213*b* of the second rib 221*b*.

According to an embodiment of the disclosure, the thickness d of the decoration member 250 may be designed to be smaller than the distance L3 from the edge 213 or 214 of the outer frame 210 to the rib 221*a* or 221*b*, but the disclosure is not limited thereto.

Referring to FIG. 15, the decoration member 250' according to an embodiment may include a plurality of segments 2511, 2512, 2513, 2514, and 2515 having various colors. For example, as illustrated in FIG. 15, the segments 2511, 2512, 2513, 2514, and 2515 of the decoration member 250' may have different colors. When the inner frame 240 is formed of a transparent material, the decoration member 250' may act as a decorative element for the user as it is visible from the outside.

As a result, when the inner frame 240 is formed of a transparent material, the decoration members 250 and 250' may prevent components disposed inside the electronic devices 200 and 200', such as the electronic component portion 230, from being exposed to the outside, and may be configured in a combination of various colors to provide an enhanced aesthetic sense to the user.

Figure 16A:
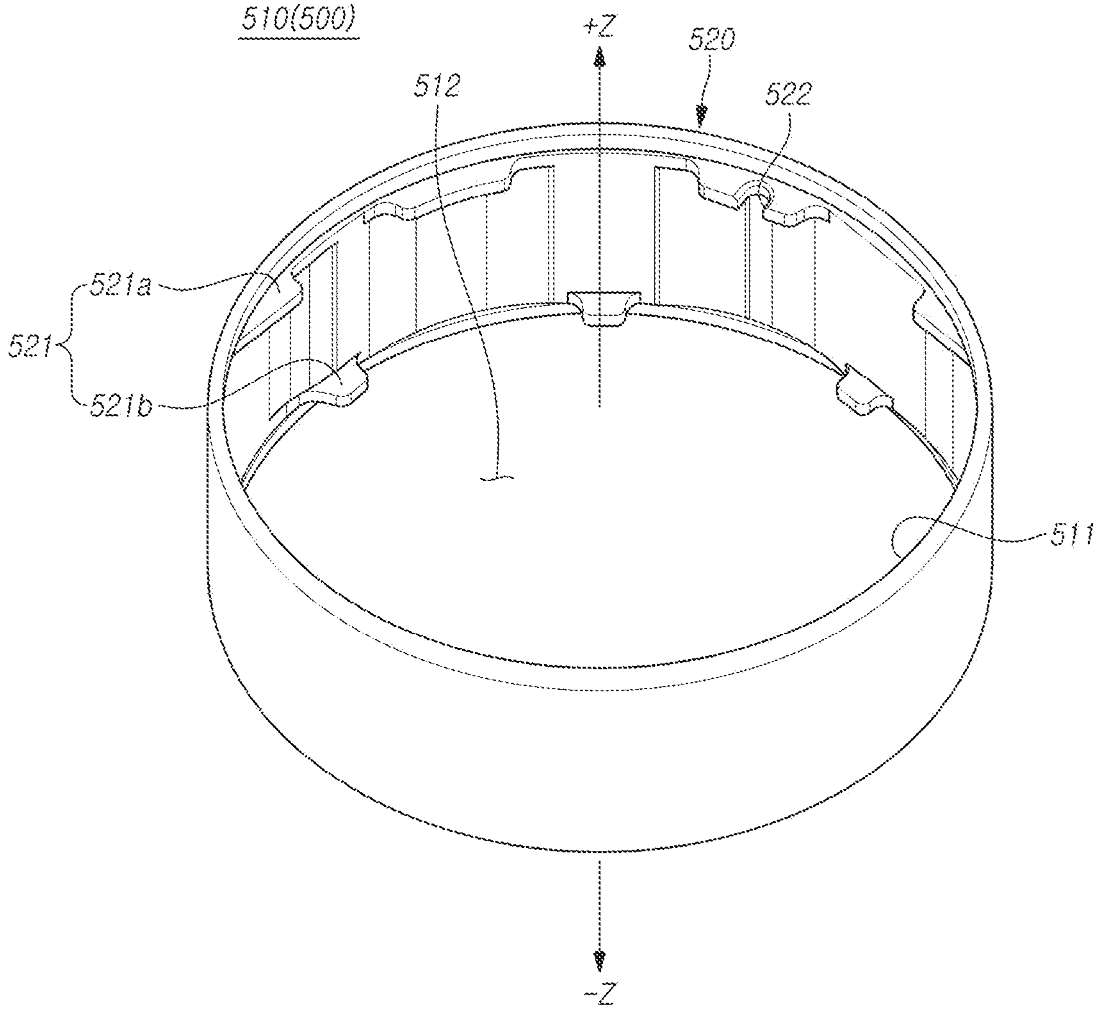
FIG. 16A is a perspective view illustrating an outer frame according to an embodiment of the disclosure.
Figure 16B:
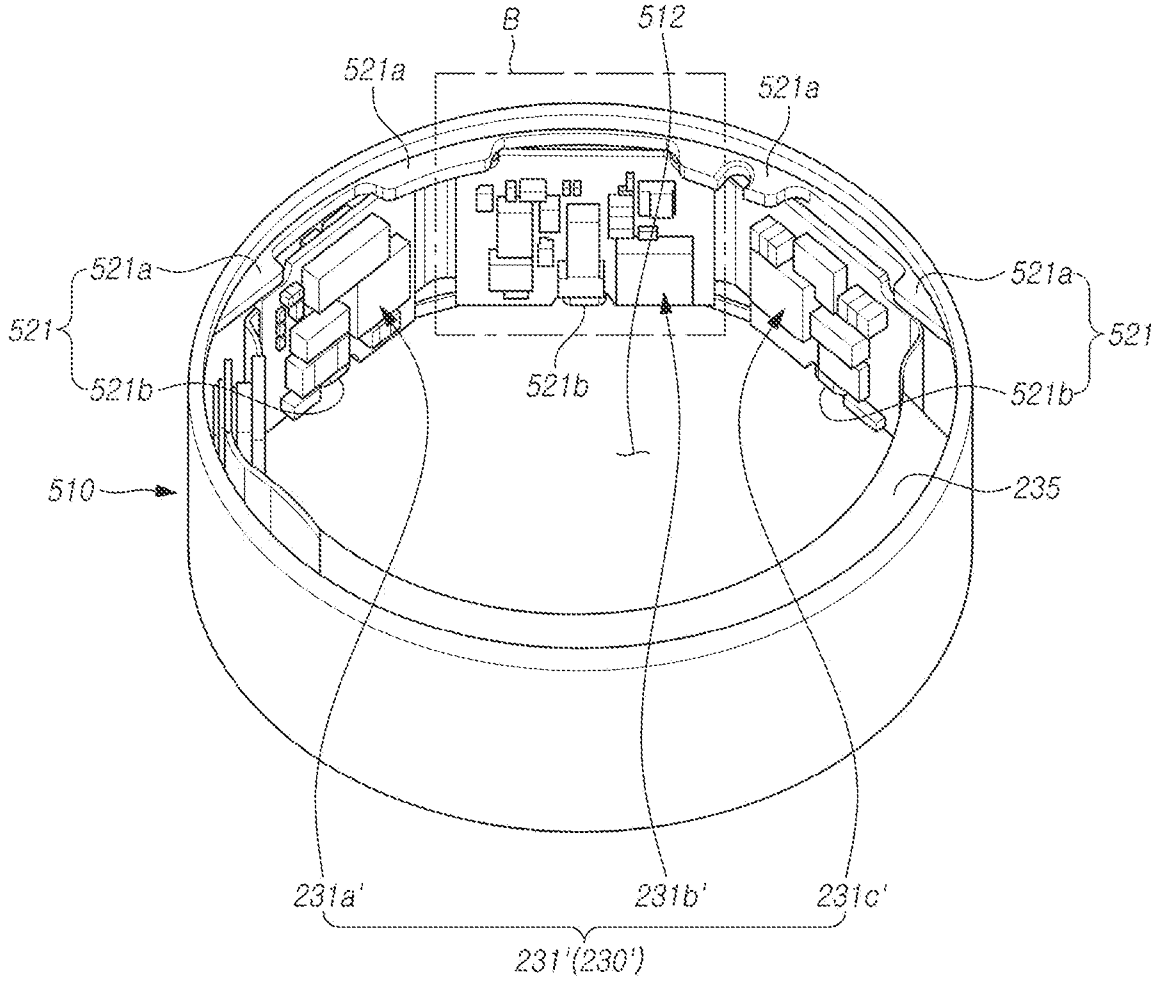
FIG. 16B is a perspective view illustrating an outer frame to which an electronic component portion is fixed according to an embodiment of the disclosure.

FIG. 16A is a perspective view illustrating an outer frame according to an embodiment of the disclosure. FIG. 16B is a perspective view illustrating an outer frame to which an electronic component portion is fixed according to an embodiment of the disclosure.

Since an outer frame 510 and the fixing portion 520 of a wearable electronic device 500 according to the embodiment illustrated in FIGS. 16A and 16B are substantially the same as or similar to the outer frame 210 and the fixing portion 220 of the wearable electronic device 200 according to the embodiment illustrated in FIG. 2A in terms of function, shape, and/or structure, descriptions of the outer frame 210 and the fixing portion 220 of the wearable electronic device 200 illustrated in FIG. 2A may be equally applied. The following description focuses only on differences while the same or corresponding parts are omitted from the description.

Referring to FIGS. 16A and 16B, the wearable electronic device 500 according to an embodiment may include an outer frame 510, a fixing portion 520, an electronic component portion 230', and an inner frame (e.g., the inner frame 240 of FIG. 2C).

According to an embodiment of the disclosure, the outer frame 510 may form an outer portion of the wearable electronic device 500. In an embodiment of the disclosure, the outer frame 510 may have an inner surface 511 having an overall ring shape to define a hole 512 inside. In an embodiment of the disclosure, the outer frame 510 may have an inner surface 511 having an overall ring shape to define the hole 512 inside.

According to an embodiment of the disclosure, the fixing portion 520 may be configured to fix the electronic component portion 230' inside the outer frame 510. According to an embodiment of the disclosure, the fixing portion 520 may be provided on the inner surface 511 of the outer frame 510. Hereinafter, for convenience of description, the structure, function, and/or shape of the fixing portion 520 is described below with reference to FIGS. 17 and 18.

Figure 17:
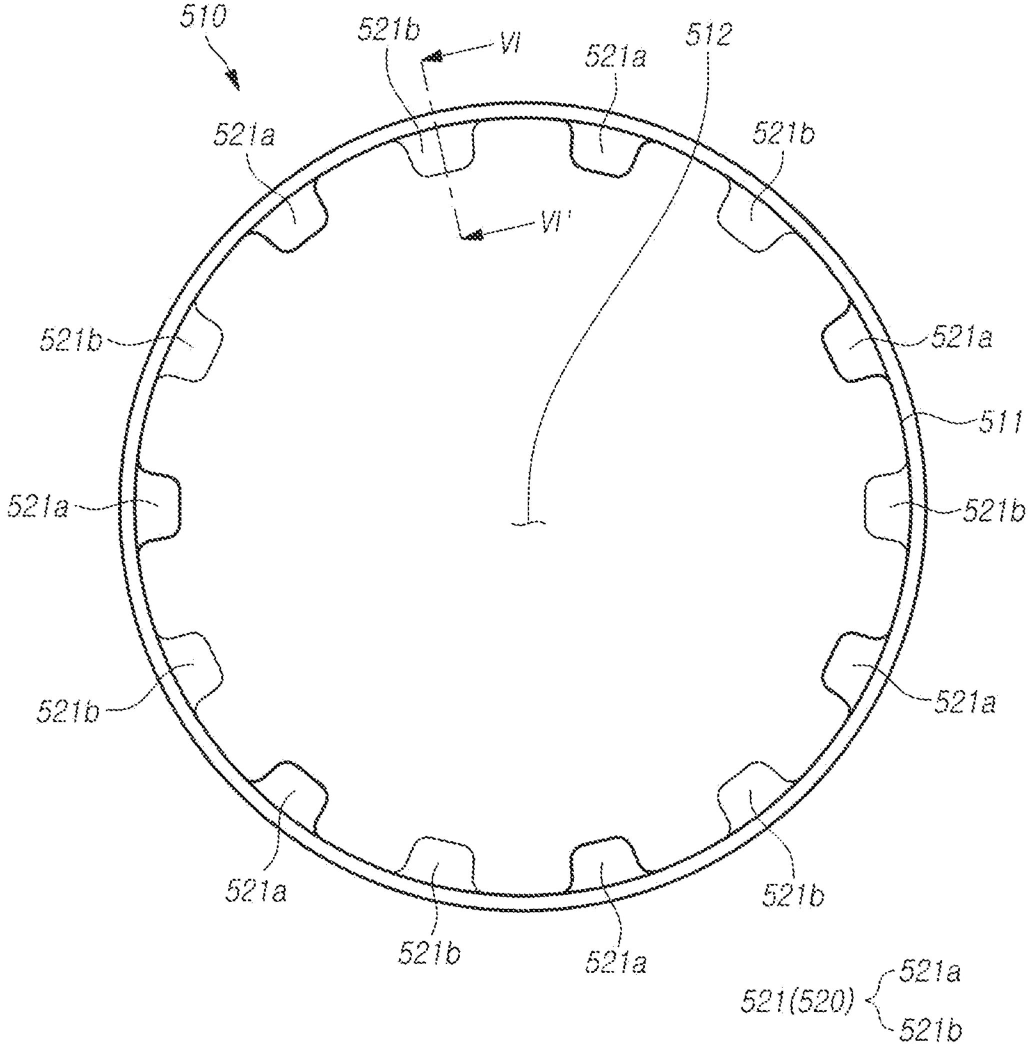
FIG. 17 is a plan view illustrating an outer frame according to an embodiment of the disclosure.
Figure 18:
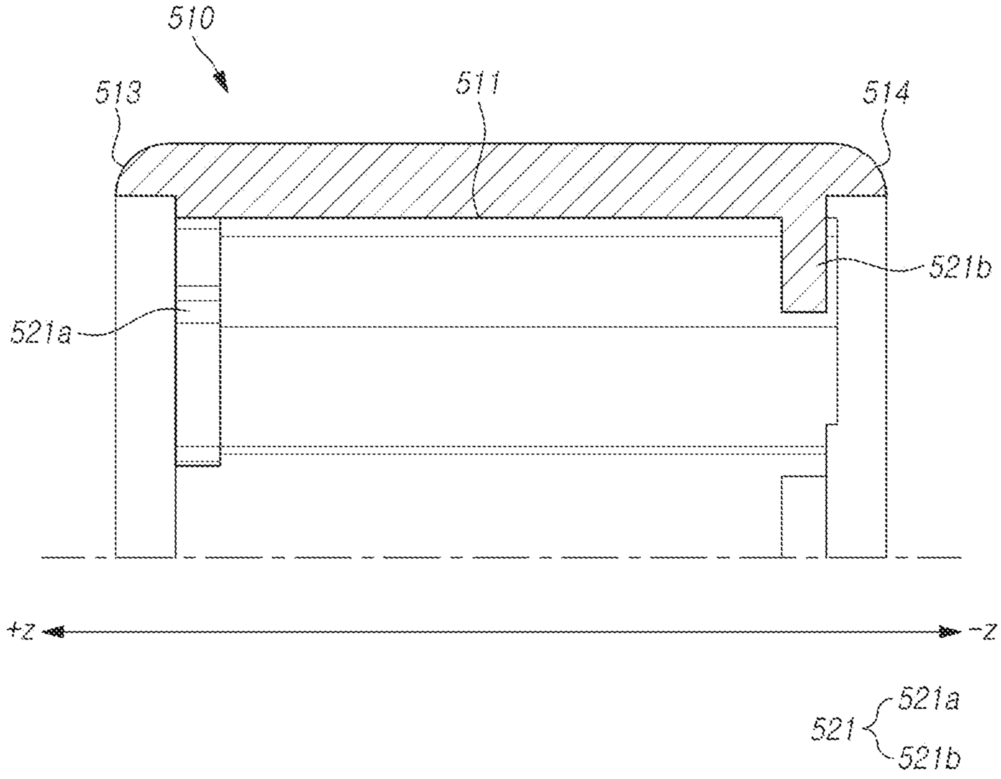
FIG. 18 is a cross-sectional view taken along line VI-VI' of FIG. 17 according to an embodiment of the disclosure.
Figure 19:
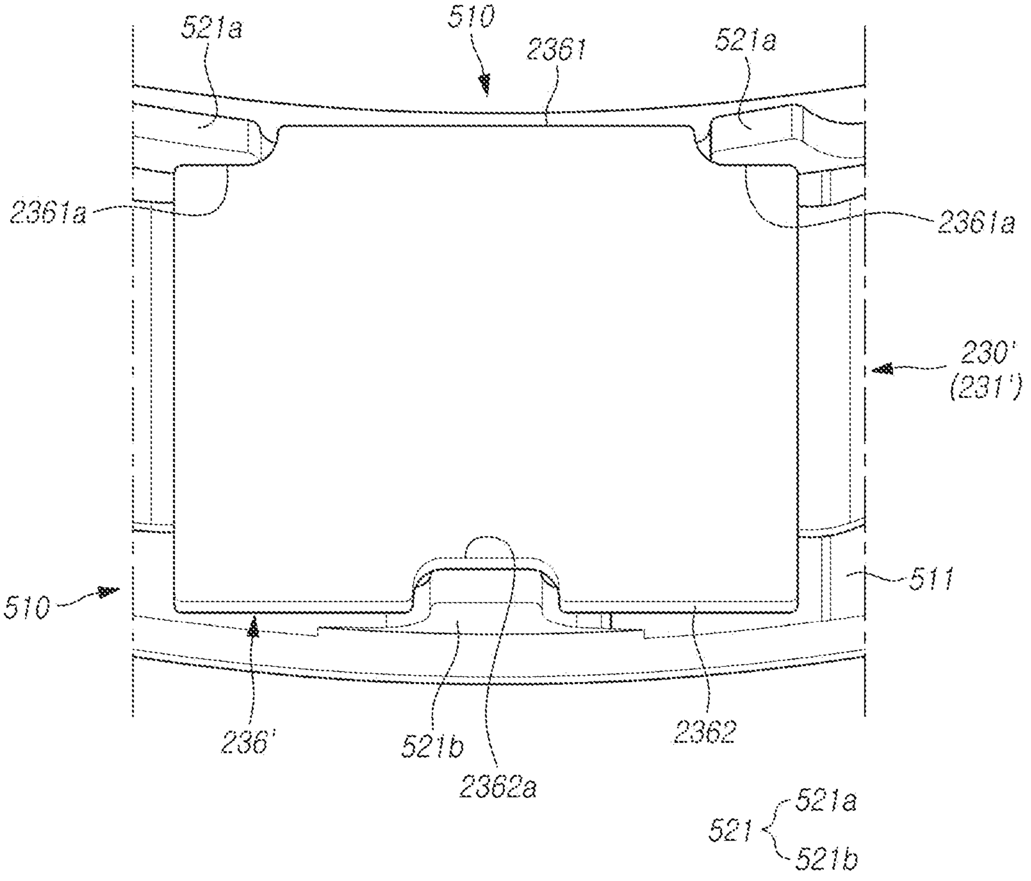
FIG. 19 is an enlarged view of portion B of FIG. 16B according to an embodiment of the disclosure.
Figure 20A:
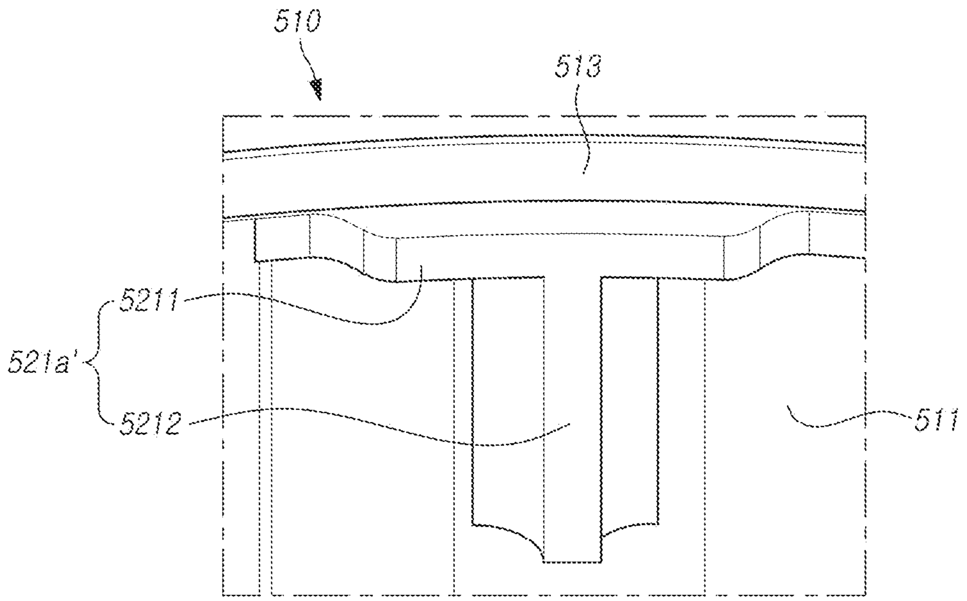
FIGS. 20A and 20B are an enlarged view of a portion of an outer frame having a first rib according to an embodiment of the disclosure.
Figure 20B:
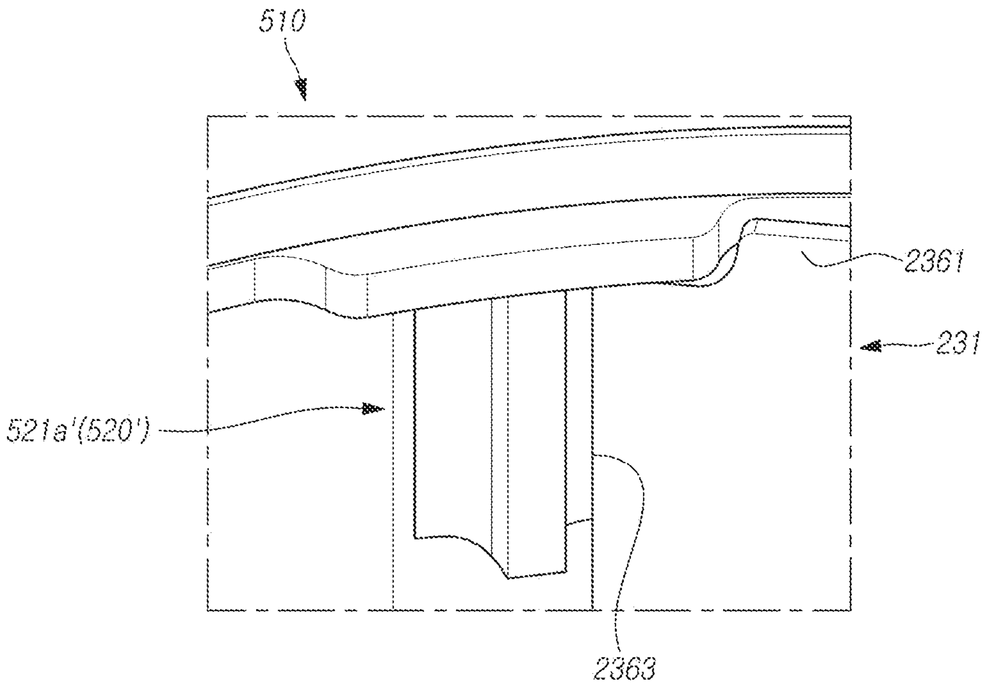

FIG. 17 is a plan view illustrating an outer frame according to an embodiment of the disclosure. FIG. 18 is a cross-sectional view taken along line VI-VI' of FIG. 17 according to an embodiment of the disclosure. FIG. 19 is an enlarged view of portion B of FIG. 16B according to an embodiment of the disclosure. FIGS. 20A and 20B are an enlarged view of a portion of an outer frame having a first rib according to an embodiment of the disclosure.

Referring to FIGS. 17 and 18, the fixing portion 520 of the wearable electronic device (e.g., the wearable electronic device 500 of FIGS. 16A and 16B) according to an embodiment may include a plurality of ribs 521 protruding from the inner surface 511 of the outer frame 510 toward or in the direction of the center of the hole 512.

According to an embodiment of the disclosure, each of the plurality of ribs 521 may be disposed on the inner surface 511 of the outer frame 510 at a different position. In an embodiment of the disclosure, the plurality of ribs 521 may be spaced apart from each other at predetermined intervals in the circumferential direction along the inner surface 511 of the outer frame 510.

According to an embodiment of the disclosure, the plurality of ribs 521 may include a plurality of first ribs 521*a* disposed on an upper side on the inner surface 511 of the outer frame 510 (e.g., in the +Z-axis direction) and a plurality of second ribs 521*b* disposed on a lower side on the inner surface 511 of the outer frame 510 (e.g., in the −Z-axis direction). In an embodiment of the disclosure, the plurality of first ribs 521*a* and the plurality of second ribs 521*b* may be substantially the same or similar in function, shape, and/or structure except for arrangement positions.

According to an embodiment of the disclosure, the plurality of first ribs 521*a* and the plurality of second ribs 521*b* may be disposed not to overlap each other in the extending direction (e.g., the ±Z-axis direction) of the hole 512. For example, the plurality of first ribs 521*a* and the plurality of second ribs 521*b* may be disposed to cross each other along the inner surface 511 of the outer frame 510 when the outer frame 510 is viewed from thereabove (e.g., the +Z axis). In this case, the plurality of first ribs 521*a* and the plurality of second ribs 521*b* may be alternately disposed at predetermined intervals along the inner surface 511 of the outer frame 510 when the outer frame 510 is viewed from thereabove (e.g., +Z axis) as illustrated in FIG. 17.

According to an embodiment of the disclosure, the plurality of first ribs 521*a* may be disposed at positions spaced apart from an upper end 513 of the outer frame 510 by a predetermined interval inward (e.g., in the −Z-axis direction).

According to an embodiment of the disclosure, the plurality of second ribs 521*b* may be disposed at positions spaced apart from a lower end 514 of the outer frame 510 by a predetermined interval inward (e.g., in the +Z-axis direction).

In this case, a space (or a gap) may be formed between the two opposite edges 513 and 514 of the outer frame 510 and the plurality of ribs 521, and the decoration member 250 and 250' of FIGS. 13 to 15 described above may be disposed in the space (or the gap).

According to an embodiment of the disclosure, any one of the plurality of first ribs 521*a* may include a positioning portion (522 of FIG. 16A).

In an embodiment of the disclosure, the positioning portion 522 may be recessed outward from an inner surface (e.g., a surface facing the hole 512) of the first rib 521*a*, but the disclosure is not limited thereto. In this case, the positioning portion 522 may be referred to as a positioning recess. In an embodiment of the disclosure, the positioning portion 522 may be implemented in a hole shape, and in this case, the positioning portion 522 may be referred to as a positioning hole.

In an embodiment of the disclosure, the positioning portion 522 may be provided in the first rib 521*a* adjacent to the sensor 231*b*' positioned in the middle among the sensor units 231*a*', 231*b*', and 231*c*' of the electronic component portion 230' when the electronic component portion 230' is assembled.

When the positioning portion 522 is so provided in the first rib 521*a*, the positioning portion 5211 may guide the electronic component portion 230 to the assembly position.

Further, during the injection process or the molding process of the inner frame 240, the positioning portion 522 may be engaged with the positioning protrusion (612 of FIG. 22B) of a positioning jig (610 of FIG. 22B), which is described below, to match the alignment of the biometric signal detector 243 that is molded with the sensor unit 231 of the electronic component portion 230.

Referring to FIG. 19, the electronic component portion 230' according to an embodiment may be interposed between the plurality of ribs 521 and may be fixed on the inner surface 511.

According to an embodiment of the disclosure, the substrate 236' of the electronic component portion 230' may include an upper suspension portion 2361*a* cut in the corner of the edge of the upper end 2361 of the substrate 236' to have a concave surface and a lower suspension portion 2362*a* cut at a lower end 2362 of the substrate 236'.

According to an embodiment of the disclosure, the upper suspension portion 2361*a* may be formed in each of the corners of the upper end 2361 of the substrate 236', and may be disposed to surround at least a portion of the adjacent first rib 521*a* when the electronic component portion 230' is assembled.

According to an embodiment of the disclosure, the lower suspension portion 2362*a* may be formed in the central portion of the lower end 2362 of the substrate 236', and may be disposed to surround at least a portion of the second rib 521*b* when the electronic component portion 230' is assembled.

In this case, as the sensor unit 231' of the electronic component portion 230' is restricted/stopped or supported by the plurality of first ribs 521*a* and the plurality of second ribs 521*b* by the suspension portions 2361*a* and 2362*a*, the movement of the sensor unit 231' in the vertical direction (e.g., the +Z axis direction) and/or the circumferential direction may be restricted.

For example, the plurality of first ribs 521*a* may function as an obstacle, such as a stopper to the upper portion of the electronic component portion 230', and the plurality of second ribs 521*b* may function as an obstacle, such as a stopper to the lower portion of the electronic component portion 230', thereby preventing the electronic component portion 230' from falling off the fixing portion 520.

FIG. 20A is an enlarged view of a portion of the first rib 521*a*' before the electronic component portion 230' is assembled, and FIG. 20B is an enlarged view of a portion of the first rib 521*a*' after the electronic component portion 230' is assembled.

Referring to FIGS. 20A and B, the first fixing rib 521*a*' according to an embodiment may overall have a T-shape.

According to an embodiment of the disclosure, the first rib 521*a*' may include a body portion 5211 extending in the circumferential direction along the inner surface 511 of the outer frame 510, and a fixing reinforcing portion 5212 extending in the vertical direction (e.g., the −Z-axis direction) from the body portion 5211.

In this case, the first rib 521*a*', along with the second rib 521*b*, may surround at least a portion of the four corners (e.g., the upper end 2361, the lower end 2362, and/or a side end 2363 of the substrate 236') of the electronic component portion 230', thereby restricting the movement of the electronic component portion 230' with respect to the outer frame 510. More particularly, unlike the first rib 521 illustrated in FIGS. 16A, 16B, and 17 to 19, the first rib 521 of FIG. 20 has the fixing reinforcing portion 5212, thereby effectively restricting the movement of the electronic component portion 230' in the left-right direction (or circumferential direction) with respect to the outer frame 510.

Figure 21:
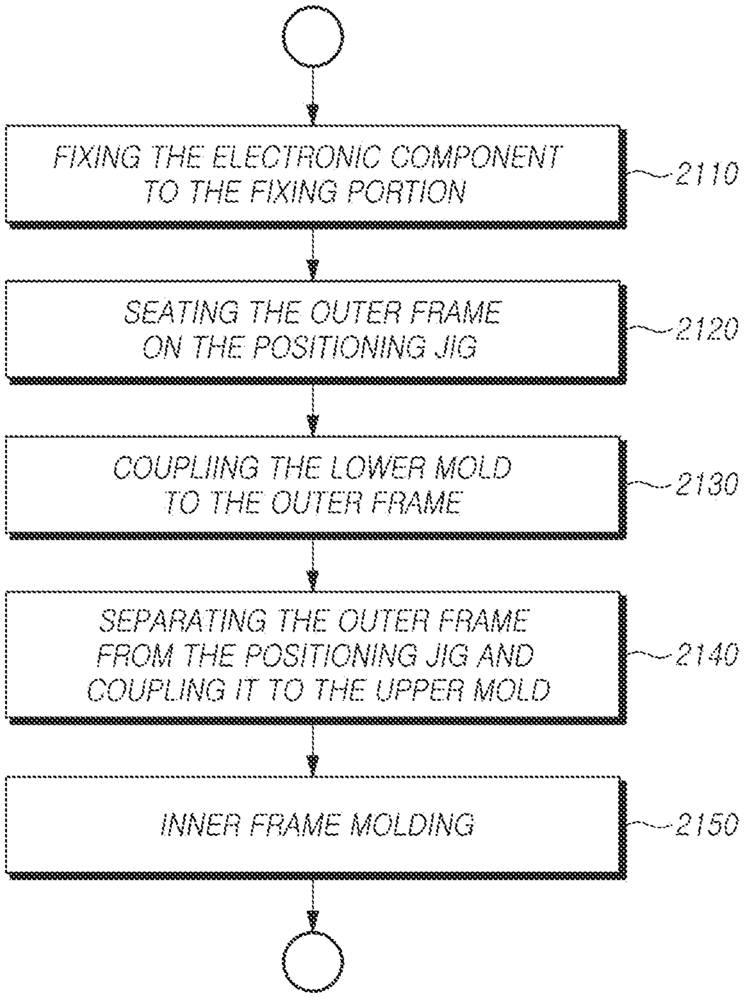
FIG. 21 is a manufacturing flowchart of a ring-shaped wearable electronic device according to an embodiment of the disclosure.
Figure 22A:
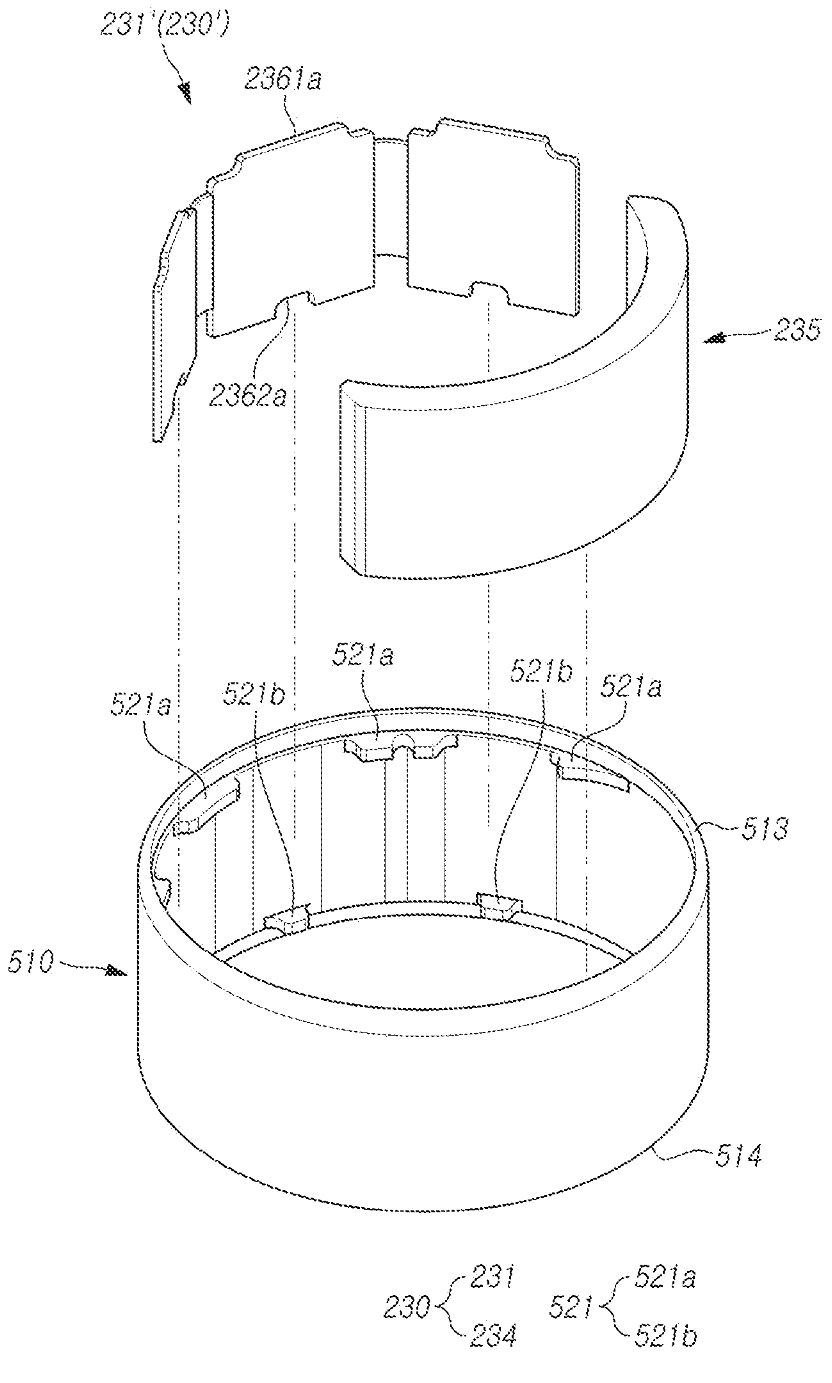
FIG. 22A is a view illustrating a process for assembling an outer frame and an electronic component portion according to an embodiment of the disclosure.
Figure 22B:
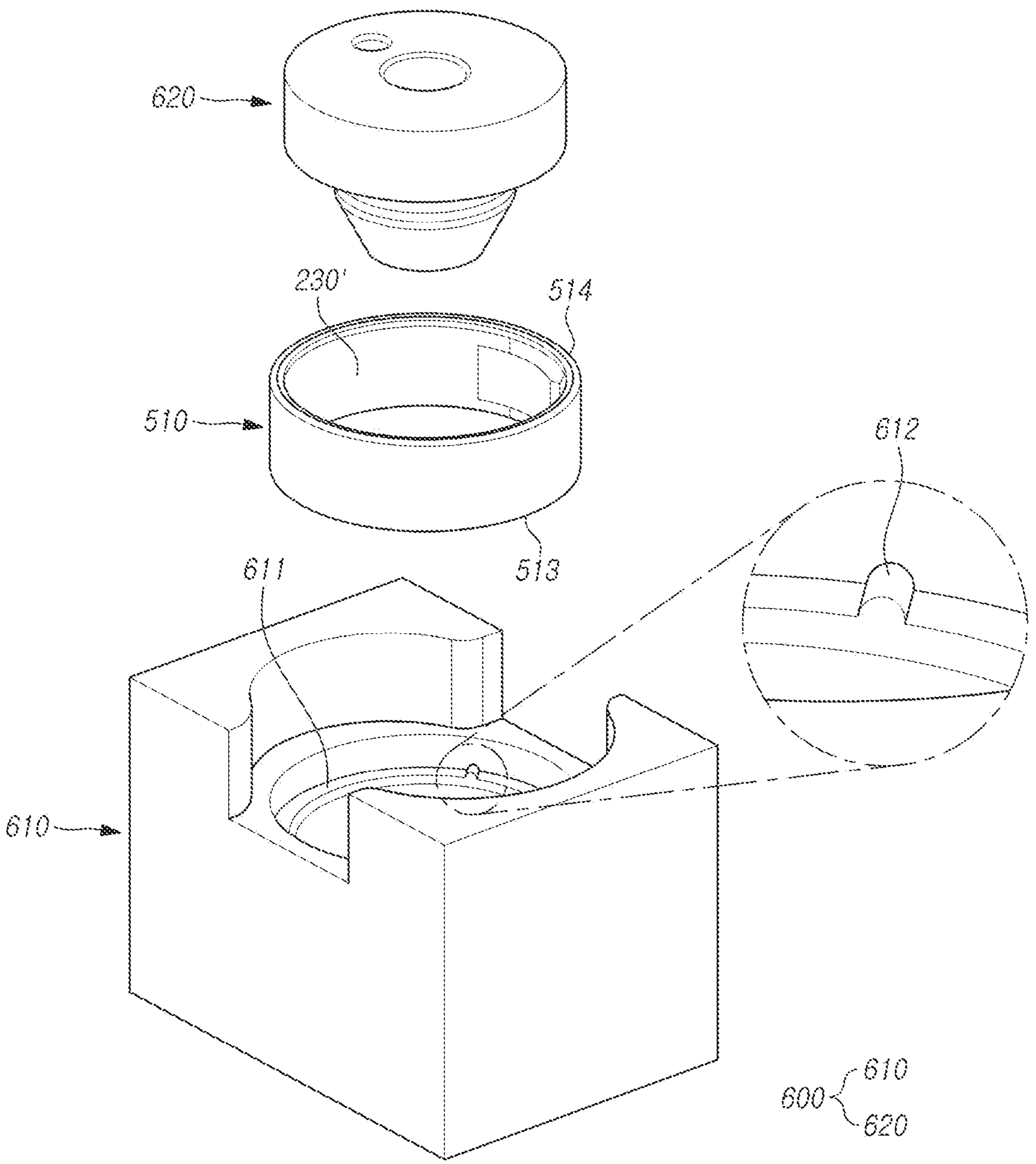
FIG. 22B is a view illustrating a molding process of an inner frame according to an embodiment of the disclosure.

FIG. 21 is a manufacturing flowchart of a ring-shaped wearable electronic device according to an embodiment of the disclosure. FIG. 22A is a view illustrating a process for assembling an outer frame and an electronic component portion according to an embodiment of the disclosure. FIG. 22B is a view illustrating a molding process of an inner frame according to an embodiment of the disclosure.

Referring to FIGS. 21, 22A and 22B, when assembling the electronic component portion 230', the worker may insert each or all of the sensor unit 231' of the electronic component portion 230' and the battery 235 into the fixing portion 520 provided in the outer frame 510 (2110). For example, the worker may place the electronic component portion 230' between the first rib 521*a* and the second rib 521*b* provided on the outer frame 510 and fix the electronic component portion 230' to the inner surface of the outer frame 510. In this case, the worker may identify a predetermined assembly position of the sensor unit 231 through the positioning portion 522 formed in the first rib 521*a*.

After, for the molding process of the inner frame (e.g., the inner frame 240 of FIG. 2C), the worker may seat the outer frame 510 to which the electronic component portion 230' is coupled to a seating portion 611 of the positioning jig 610 such that the upper end 513 of the outer frame 510 faces the positioning jig 610 (2120). In this case, although not specifically illustrated, the worker may position the outer frame 510 such that the positioning protrusion 612 provided in the positioning jig 610 and the positioning portion (e.g., the positioning portion 522 of FIG. 16A) of the first rib (e.g., the first rib 521*a*) are engaged with each other.

The worker may insert and couple the a lower mold 620 to the outer frame 510 (2130), to which the electronic component portion 230' is coupled, then separate the positioning jig 610 from the outer frame 510, and then couple the outer frame 510 to which the lower mold 620 is coupled to the upper mold (not shown) (2140).

Afterwards, a ring-shaped wearable electronic device may be manufactured by molding the inner frame 240 by injecting molding liquid into the upper mold and the lower mold to which the outer frame 510 is coupled (2150).

In this series of manufacturing processes, as the alignment of the upper/lower molds and the outer frame 510 is correctly maintained by the positioning portion 522 of the fixing portion 520, the molding quality of the inner frame 240 may be enhanced.

Figure 23A:
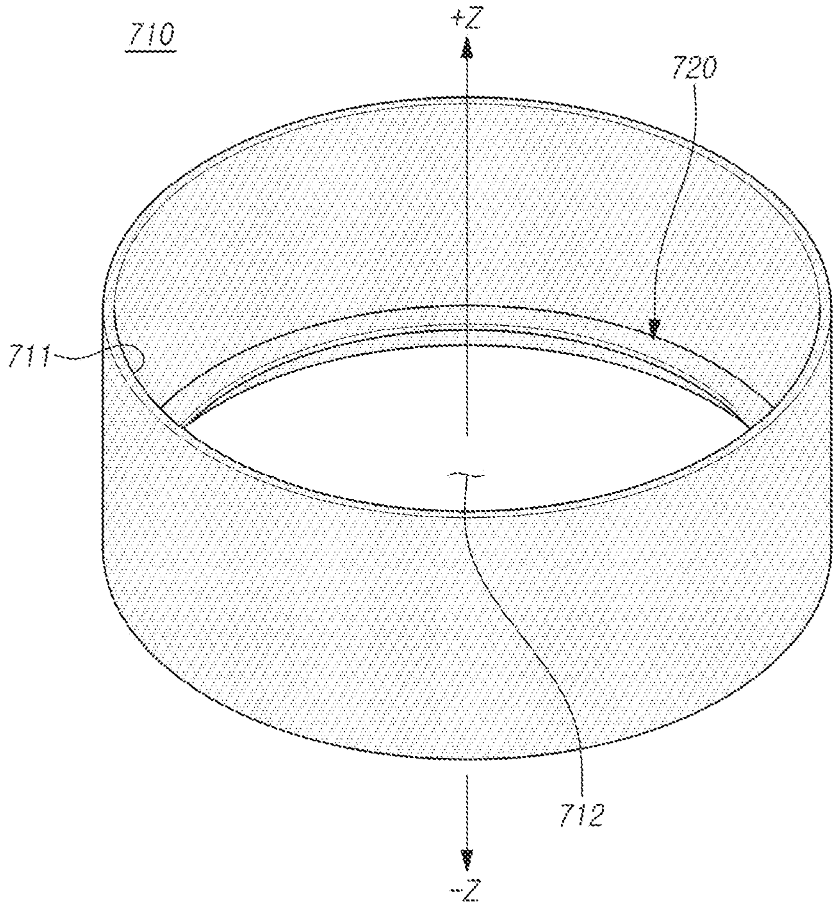
FIG. 23A is a perspective view of an outer frame according to one embodiment of the disclosure.
Figure 23B:
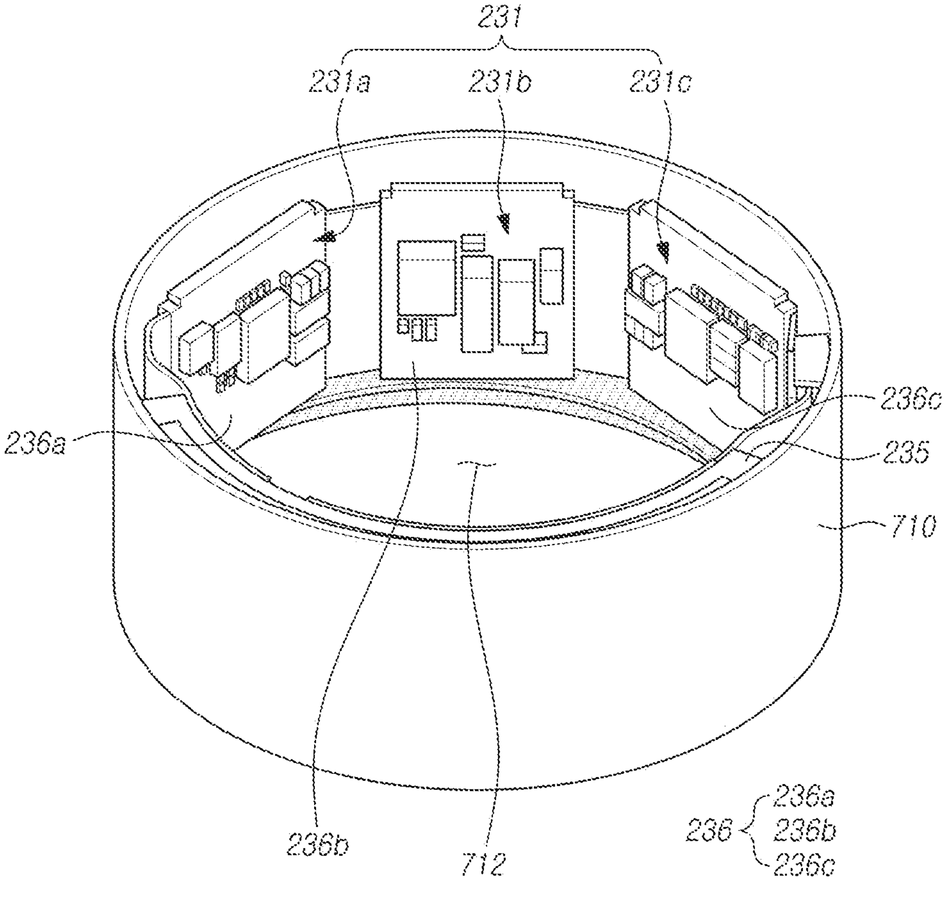
FIG. 23B is a perspective view of an outer frame to which an electronic component part is fixed according to an embodiment of the disclosure.
Figure 24:
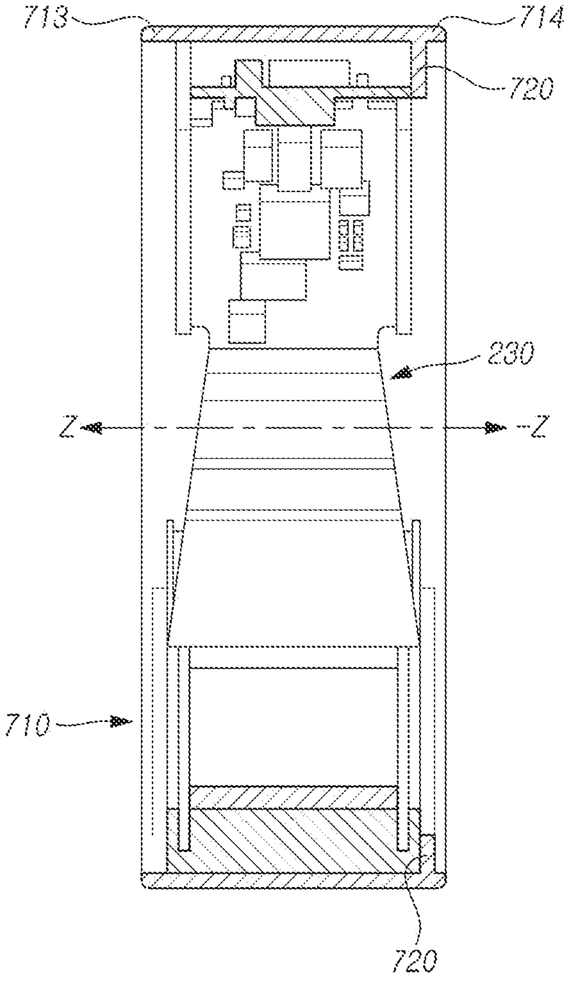
FIG. 24 is a cross-sectional view of a ring-shaped wearable electronic device according to an embodiment of the disclosure.

FIG. 23A is a perspective view of an outer frame according to one embodiment of the disclosure. FIG. 23B is a perspective view of an outer frame to which an electronic component part is fixed according to an embodiment of the disclosure. FIG. 24 is a cross-sectional view of a ring-shaped wearable electronic device according to an embodiment of the disclosure.

Referring to FIGS. 23A, 23B and 24, a ring-shaped wearable electronic device (e.g., the ring-shaped wearable electronic device of FIG. 2C) according to an embodiment of the disclosure may include an outer frame 710, a fixing portion 720, an electronic component portion 230, and an inner frame (e.g., inner frame 240 in FIG. 2C).

Hereinafter, description of parts that overlap with the configuration described in FIGS. 1 to 22B will be omitted.

According to an embodiment, the outer frame 710 may form an outer portion of the wearable electronic device. In an embodiment, the outer frame 710 may have an inner surface 711 having an overall ring shape to define a hole 712 inside. In an embodiment, the hole 712 defined inside the outer frame 710, may extend in the Z-axis direction, as illustrated in FIG. 23A. In an embodiment of the disclosure, the outer frame 710 may be formed of a metal material. For example, the outer frame 710 may be formed of a highly rigid titanium material, but the disclosure is not limited thereto. The outer frame 710 may be referred to as a metal member or outer part.

According to an embodiment of the disclosure, the fixing portion 720 may be configured to fix, secure, or house the electronic component portion 230 inside the outer frame 710. According to an embodiment of the disclosure, the fixing portion 720 may be provided on the inner surface 711 of the outer frame 710. According to one embodiment of the disclosure, the fixing portion 720 may protrude from the inner surface 711 toward the hole 712. According to one embodiment of the disclosure, the fixing portion 720 may extend along the inner surface 711 in the circumferential direction of the outer frame 710. For example, the fixing portion 720 may have an overall ring shape when looking at the outer frame 710 from above (e.g., +Z-axis direction). According to one embodiment of the disclosure, the fixing portion 720 may be disposed closer to the lower end 714 of the outer frame 710 than the upper end 713. For example, the fixing portion 720 may be located adjacent to the lower end 714 of the outer frame 710.

According to one embodiment of the disclosure, the electronic component portion 230 may be seated on the upper surface of the fixing portion 720 and fixed on the outer frame 710. The ring-shaped wearable electronic device may be manufactured by coupling the inner frame to cover the inner surface 711 of the outer frame 710 and the electronic component portion 230 while the electronic component portion 230 fixed to the outer frame 710 is fixed.

A ring-shaped wearable electronic device (200, 200', 300, 400, 500) according to an embodiment of the disclosure may comprise at least one electronic component (230, 230'). The ring-shaped wearable electronic device (200, 200', 300, 400, 500) may comprise a ring-shaped outer frame (210, 310, 410, 510) including an inner surface (211, 311, 411, 511). The ring-shaped wearable electronic device (200, 200', 300, 400, 500) may comprise a fixing portion (220, 320, 420, 520) protruding from the inner surface (211, 311, 411, 511) of the outer frame (210, 310, 410, 510). The ring-shaped wearable electronic device (200, 200', 300, 400, 500) may comprise an inner frame 240 integrally formed on the outer frame (210, 310, 410, 510) to cover the electronic component (230, 230'), the fixing portion (220, 320, 420, 520), and the inner surface (211, 311, 411, 511) of the outer frame (210, 310, 410, 510), the inner frame 240 may have a ring-shaped opening configured to receive a finger of a user. The fixing portion (220, 320, 420, 520) may include a plurality of first ribs (221*a*, 221*a*', 221*a*", 321*a*, 421*a*, 521*a*) located to an upper end portion (213, 513) of the outer frame (210, 310, 410, 510) and spaced apart from each other and a plurality of second ribs (221*b*, 221*b*', 221*b*", 321*b*, 421*b*, 521*b*) located to a lower end portion (214, 514) of the outer frame (210, 310, 410, 510) and spaced apart from each other. At least a portion of the electronic component 230 may be disposed between the plurality of ribs (221*a*, 221*a*', 221*a*", 321*a*, 421*a*, 521*a*, 221*b*, 221*b*', 221*b*", 321*b*, 421*b*, 521*b*) so that the at least one electronic component 230 is fixed to the outer frame (210, 310, 410, 510) with the inner frame 240 integrally formed on the outer frame (210, 310, 410, 510).

According to an embodiment of the disclosure, the inner frame 240 may be integrally formed on the outer frame (210, 310, 410, 510) by performing a molding process directly on an inner side of the outer frame (210, 310, 410, 510) having the at least one electronic component (230, 230') disposed between the plurality of first ribs (221*a*, 221*a*', 221*a*", 321*a*, 421*a*, 521*a*) and the plurality of second ribs (221*b*, 221*b*', 221*b*", 321*b*, 421*b*, 521*b*).

According to an embodiment of the disclosure, the inner frame 240 may be integrally formed on the outer frame (210, 310, 410, 510) by injecting a resin material such that the resin material forming the inner frame 240 contacts at least a portion of the first ribs (221*a*, 221*a*', 221*a*", 321*a*, 421*a*, 521*a*) and at least a portion of the second ribs (221*b*, 221*b*', 221*b*", 321*b*, 421*b*, 521*b*).

According to an embodiment of the disclosure, each one of the plurality of first ribs (221*a*, 221*a*', 221*a*", 321*a*, 421*a*) is disposed to be aligned with a respective one of the plurality of second ribs (221*b*, 221*b*', 221*b*", 321*b*, 421*b*).

According to an embodiment of the disclosure, the plurality of first ribs 521*a* and the plurality of second ribs 521*b* may be disposed so as not to be aligned with each.

According to an embodiment of the disclosure, the fixing portion (220, 320, 420) may include a rib pair (221, 221', 221", 221'", 321, 421) including the first rib (221*a*, 221*a*', 221*a*", 321*a*, 421*a*) and the second rib (221*b*, 221*b*', 221*b*", 321*b*, 421*b*).

According to an embodiment of the disclosure, the fixing portion (220, 320, 420) may include a plurality of rib pairs (221, 221', 221", 221'", 321, 421). The plurality of rib pairs (221, 221', 221", 221'", 321, 421) may be disposed to be spaced apart from each other along a circumferential direction of the inner surface (211, 311, 411 of the outer frame 210, 310, 410.

According to an embodiment of the disclosure, each rib (221*a*, 221*a*', 221*a*", 321*a*, 421*a*, 221*b*, 221*b*', 221*b*", 321*b*, 421*b*) of the rib pair (221, 221', 221", 221'", 321, 421) may include a seating portion 2214 having a step structure and provided on one surface 2212 facing another rib (221*a*, 221*a*', 221*a*", 321*a*, 421*a*, 221*b*, 221*b*', 221*b*", 321*b*, 421*b* of the rib pair (221, 221', 221", 221'", 321, 421). Each of two opposite side portions (230*a*, 230*b*) of the electronic component portion 230 with respect to an extending direction of the opening (212, 312, 412) of the outer frame (210, 310, 410) may be disposed on the seating portion 2214.

According to an embodiment of the disclosure, at least one rib (221*a*, 221*a*', 221*a*", 321*a*, 421*a*, 221*b*, 221*b*', 221*b*", 321*b*, 421*b*) of the rib pair (221, 221', 221", 221'", 321, 421)

may include a recess 2215 formed in one surface 2212 facing another rib (221*a*, 221*a*', 221*a*", 321*a*, 421*a*, 221*b*, 221*b*', 221*b*", 321*b*, 421*b*) of the rib pair (221, 221', 221", 221'", 321, 421). The at least a portion (230*a*, 230*b*) of the at least electronic component 230 may be disposed to be fitted into the fixing recess 2215.

According to an embodiment of the disclosure, the at least a portion (230*a*, 230*b*) of the electronic component portion 230 may be fixed to at least one rib (221*a*, 221*a*', 221*a*", 321*a*, 421*a*, 221*b*, 221*b*', 221*b*", 321*b*, 421*b*) of the rib pair 221, 221', 221", 221'", 321, 421 by a bonding method.

According to an embodiment of the disclosure, at least one (rib 221*a*, 221*a*', 221*a*", 321*a*, 421*a*, 221*b*, 221*b*', 221*b*", 321*b*, 421*b*) of the rib pair (221, 221', 221", 221'", 321, 421) may include a first surface 2212 facing another rib (221*a*, 221*a*', 221*a*", 321*a*, 421*a*, 221*b*, 221*b*', 221*b*", 321*b*, 421*b*) of the rib pair and a second surface 2213 opposite to the first surface 2212. A bonding reinforcing portion 251 may be included that is provided on at least one of the second surface 2213 of the rib (221*a*, 221*a*', 221*a*", 321*a*, 421*a*, 221*b*, 221*b*', 221*b*", 321*b*, 421*b*) or the inner surface (211*a*, 211*b*) of the outer frame (210, 310, 410 extending toward the edge (213, 214 of the outer frame (210, 310, 410) and has an irregularity pattern formed.

According to an embodiment of the disclosure, at least one rib (221*a*, 221*a*', 221*a*", 321*a*, 421*a*, 221*b*, 221*b*', 221*b*", 321*b*, 421*b*) of the rib pair (221, 221', 221", 221'", 321, 421) may include a first surface 2212 facing another rib (221*a*, 221*a*', 221*a*", 321*a*, 421*a*, 221*b*, 221*b*', 221*b*", 321*b*, 421*b*) of the rib pair (221, 221', 221", 221'", 321, 421) and a second surface 2213 opposite to the first surface 2212. The outer frame (210, 310, 410, 510) includes a bonding reinforcing portion (252, 252', 252") provided on at least one of the second surface (2213) or the inner surface (211, 311, 411) of the outer frame (210, 310, 410) and extending toward the edge (213, 214) of the outer frame (210, 310, 410), and having a concavo-convex pattern.

According to an embodiment of the disclosure, the recess of the bonding reinforcing portion (252, 252', 252") may be provided to have a semi-circular or polygonal cross section.

According to an embodiment of the disclosure, a first reinforcing portion 322 may be included that is disposed between the rib pairs (221, 221', 221", 221'", 321, 421) disposed to be spaced apart from each other.

According to an embodiment of the disclosure, the first reinforcing portion 322 may protrude from the inner surface (211, 311, 411) of the outer frame (210, 310, 410) to the inside of the ring-shaped opening (212, 312, 412) of the outer frame (210, 310, 410) and extend along the extending direction of the opening (212, 312, 412).

According to an embodiment of the disclosure, a protruding height of the first reinforcing portion 322 with respect to the inner surface (211, 311, 411) of the outer frame (210, 310, 410) may be set to be identical to or smaller than a height of each rib (221*a*, 221*a*', 221*a*", 321*a*, 421*a*, 221*b*, 221*b*', 221*b*", 321*b*, 421*b*) of the rib pairs (221, 221', 221", 221'", 321, 421) adjacent to the first reinforcing portion 322 with respect to the inner surface (211, 311, 411 of the outer frame (210, 310, 410).

According to an embodiment of the disclosure, a length L2 of the first reinforcing portion 322 extending along the extending direction of the opening (212, 312, 412) may be set to be shorter than a distance L1 between outer surfaces 3213 of the ribs (221*a*, 221*a*', 221*a*", 321*a*, 421*a*, 221*b*, 221*b*', 221*b*", 321*b*, 421*b* of each rib pair (221, 221', 221", 221'", 321, 421) adjacent to the first reinforcing portion 322.

According to an embodiment of the disclosure, at least one rib (221*a*, 221*a*', 221*a*", 321*a*, 421*a*, 221*b*, 221*b*', 221*b*", 321*b*, 421*b* of the rib pair (221, 221', 221", 221'", 321, 421) may include a first surface 2212 facing another rib (221*a*, 221*a*', 221*a*", 321*a*, 421*a*, 221*b*, 221*b*', 221*b*", 321*b*, 421*b* of the rib pair (221, 221', 221", 221'", 321, 421) and a second surface 2213 opposite to the first surface 2212. At least one second reinforcing portion 424 may be included that protrudes from the inner surface (211, 311, 411 of the outer frame (210, 310, 410) to the inside of the opening (212, 312, 412) and is disposed to contact the second surface of the at least one rib (221*a*, 221*a*', 221*a*", 321*a*, 421*a*, 221*b*, 221*b*', 221*b*", 321*b*, 421*b*).

According to an embodiment of the disclosure, a protruding height H2 of the at least one second reinforcing portion 424 with respect to the inner surface (211, 311, 411 of the outer frame (210, 310, 410) may be set to be smaller than a protruding height H1 of the rib (221*a*, 221*a*', 221*a*", 321*a*, 421*a*, 221*b*, 221*b*', 221*b*", 321*b*, 421*b*) with respect to the inner surface (211, 311, 411 of the outer frame (210, 310, 410), contacted by the at least one second reinforcing part 424.

According to an embodiment of the disclosure, the fixing portion (220, 320, 420) may include a curved second reinforcing portion 425 that connects the inner surface (211, 311, 411 of the outer frame (210, 310, 410) with the at least one rib (221*a*, 221*a*', 221*a*", 321*a*, 421*a*, 221*b*, 221*b*', 221*b*", 321*b*, 421*b* of the rib pair (221, 221', 221", 221'", 321, 421) and has a predetermined curvature.

According to an embodiment of the disclosure, the inner frame 240 may be integrally coupled to the outer frame 510 by a molding process while being aligned by a positioning jig 610 having a positioning protrusion 612. At least one of a plurality of first ribs 512*a* may include a positioning portion 522 engaged with the positioning protrusion 612 of the positioning jig 610.

According to an embodiment of the disclosure, the electronic device (200, 200', 300, 400, 500) may further include a ring-shaped decoration member (250, 250') disposed to contact the inner surface (211, 311, 411, 511 of the outer frame (210, 310, 410, 510) and the fixing portion (220, 320, 420, 520).

According to an embodiment of the disclosure, each rib (221*a*, 221*a*', 221*a*", 321*a*, 421*a*, 221*b*, 221*b*', 221*b*", 321*b*, 421*b* of the rib pair (221, 221', 221", 221'", 321, 421) may have a free end shaped as a straight line or a curve.

According to an embodiment of the disclosure, the electronic component (230, 230') may include at least one of a photoplethysmography (PPG) sensor 2311, a galvanic skin response (GSR sensor 2312, an electrocardiogram (ECG) sensor 2313, an acceleration sensor 2314, a temperature sensor 2315, or a fingerprint sensor 2316.

According to an embodiment of the disclosure, the inner frame 240 may be formed of a synthetic resin and be integrally coupled to the outer frame (210, 310, 410, 510) by a molding process.

According to an embodiment of the disclosure, the outer frame (210, 310, 410, 510) may be formed of a metal material including titanium.

According to an embodiment of the disclosure, when the electronic component (230, 230') is disposed between the plurality of first fixing ribs (221*a*, 221*a*', 221*a*", 321*a*, 421*a*, 521*a*) and the plurality of second fixing ribs (221*b*, 221*b*', 221*b*", 321*b*, 421*b*, 521*b*), the plurality of first fixing ribs (221*a*, 221*a*', 221*a*", 321*a*, 421*a*, 521*a*) and the plurality of second fixing ribs (221*b*, 221*b*', 221*b*", 321*b*, 421*b*, 521*b*) are disposed to be spaced apart from each other along a direction of extension of the hole (212, 312, 412, 512) to have a distance equal to or greater than a length along the direction of extension of the hole (212, 312, 412, 512) of the electronic component (230, 230').

A ring-shaped wearable electronic device 700 according to an embodiment of the disclosure may comprise an electronic component 230. The ring-shaped wearable electronic device 700 may comprise an outer frame 710. The ring-shaped wearable electronic device 700 may comprise a fixing portion 720 protrudes from an inner surface 711 of the outer frame 710 and fixes the electronic component 230 to the outer frame 710. The ring-shaped wearable electronic device 700 may comprise an inner frame 240 coupled to the outer frame 710 to cover the electronic component 230, the fixing portion 720, and the inner surface 711 of the outer frame 710. The fixing portion 720 is located adjacent to a lower end 714 of the outer frame 710 and may extend along an inner periphery of the outer frame 710. The electronic component 230 may be seated on an upper surface of the fixing portion 720.

A manufacturing method of a ring-shaped wearable electronic device according to an embodiment of the closure may include a process 2110 of disposing an electronic component 230 between a first rib 521*a* and a second rib 521*b* of an outer frame 510. The manufacturing method of the ring-shaped wearable electronic device may include a process 2120 of seating the outer frame 510 to which the electronic component 230 is fixed on a positioning jig 610. The method of manufacturing the ring-shaped wearable electronic device may include a process 2130 of coupling the lower mold 620 to the outer frame 510 mounted on the positioning jig 610. The manufacturing method of the ring-shaped wearable electronic device may include a process 2140 of separating the outer frame 510 to which the lower mold 620 is coupled from the positioning jig 610 and then coupling it to the upper mold. The manufacturing method of the ring-shaped wearable electronic device may include a process 2150 of molding an inner frame on an outer frame 510 in which upper and lower molds are combined.

What is claimed is:

1. A wearable electronic device comprising:

at least one electronic component;

a ring-shaped outer frame including an inner surface and a fixing portion protruding from the inner surface of the outer frame; and an inner frame integrally formed on the outer frame to cover the electronic component, the fixing portion, and the inner surface of the outer frame, the inner frame having a ring-shaped opening configured to receive a finger of a user, wherein the fixing portion includes:

a plurality of first ribs located to an upper end portion of the outer frame and spaced apart from each other, and a plurality of second ribs located to a lower end portion of the outer frame and spaced apart from each other, wherein at least a portion of the at least one electronic component is disposed between the plurality of first ribs and the plurality of second ribs so that the at least one electronic component is fixed to the outer frame with the inner frame integrally formed on the outer frame, wherein each of the upper end portion of the outer frame and the lower end portion of the outer frame defines an upper region and a lower region, wherein the plurality of first ribs protrudes from the lower region of the upper end portion of the outer frame to form an upper bonding region of the inner surface, the upper bonding region being above the plurality of first ribs, wherein the plurality of second ribs protrudes from the upper region of the lower end portion of the outer frame to form a lower bonding region of the inner surface, the lower bonding region being below the plurality of second ribs, and wherein the inner frame is integrally formed on the outer frame by injecting a resin material such that the resin material forming the inner frame contacts at least a portion of: the plurality of first ribs, the plurality of second ribs, the upper bonding region, and the lower bonding region.

2. The wearable electronic device of claim 1, wherein the inner frame is integrally formed on the outer frame by performing a molding process directly on an inner side of the outer frame having the at least one electronic component disposed between the plurality of first ribs and the plurality of second ribs.

3. The wearable electronic device of claim 1, wherein each one of the plurality of first ribs is disposed to be aligned with a respective one of the plurality of second ribs.

4. The wearable electronic device of claim 3, wherein the fixing portion includes a rib pair having a first rib of any one of the plurality of first ribs and a second rib facing the first rib.

5. The wearable electronic device of claim 4, wherein the fixing portion includes a plurality of rib pairs, and wherein the plurality of rib pairs are disposed to be spaced apart from each other along a circumferential direction of the inner surface of the outer frame.

6. The wearable electronic device of claim 5, wherein a first reinforcing portion is disposed between the rib pairs disposed to be spaced apart from each other.

7. The wearable electronic device of claim 6, wherein the first reinforcing portion protrudes from the inner surface of the outer frame to an inside of the ring-shaped opening of the inner surface of the outer frame and extends along an extending direction of the ring-shaped opening of the inner surface of the outer frame.

8. The wearable electronic device of claim 7, wherein a protruding height of the first reinforcing portion with respect to the inner surface of the outer frame is set to be identical to or smaller than a height of each rib of the rib pairs adjacent to the first reinforcing portion with respect to the inner surface of the outer frame.

9. The wearable electronic device of claim 7, wherein a length of the first reinforcing portion extending along the extending direction of the ring-shaped opening of the inner surface of the outer frame is set to be shorter than a distance between outer surfaces of each of the plurality of rib pairs that are adjacent to the first reinforcing portion.

10. The wearable electronic device of claim 4, wherein each rib of the rib pair includes a seating portion having a step structure and provided on one surface facing another rib of the rib pair, and wherein each of two opposite side portions of the electronic component with respect to an extending direction of the ring-shaped opening of the inner surface of the outer frame is disposed on the seating portion.

11. The wearable electronic device of claim 4, wherein at least one rib of the rib pair includes a fixing recess formed in one surface facing another rib of the rib pair, and wherein the at least a portion of the at least electronic component is disposed to be fitted into the fixing recess.

12. The wearable electronic device of claim 4, wherein the at least a portion of the at least electronic component is fixed to at least one rib of the rib pair by a bonding method.

13. The wearable electronic device of claim 4,
wherein at least one rib of the rib pair includes:
a first surface facing another rib of the rib pair, and
a second surface opposite to the first surface, and
wherein a bonding reinforcing portion is provided on at least one of the second surface of the rib or the inner surface of the outer frame extending toward an edge of the outer frame and has an irregularity pattern.

14. The wearable electronic device of claim 4,
wherein at least one rib of the rib pair includes:
a first surface facing another rib of the rib pair, and
a second surface opposite to the first surface, and
wherein a bonding reinforcing portion provided on at least one of the second surface or the inner surface of the outer frame and extending toward an edge of the outer frame, and having a concavo-convex pattern.

15. The wearable electronic device of claim 4,
wherein at least one rib of the rib pair includes:
a first surface facing another rib of the rib pair, and
a second surface opposite to the first surface, and
wherein at least one second reinforcing portion is included that protrudes from the inner surface of the outer frame to an inside of the opening and disposed to contact the second surface of the at least one rib.

16. The wearable electronic device of claim 15, wherein a protruding height of the at least one second reinforcing portion with respect to the inner surface of the outer frame is set to be smaller than a protruding height of the rib with respect to the inner surface of the outer frame, contacted by the at least one second reinforcing portion.

17. The wearable electronic device of claim 15, wherein the fixing portion includes a curved second reinforcing portion that connects the inner surface of the outer frame with the at least one rib of the rib pair and has a predetermined curvature.

18. The wearable electronic device of claim 1, wherein the plurality of first ribs and the plurality of second ribs are disposed so as not to be aligned with each other.

19. The wearable electronic device of claim 1, further comprising:
a ring-shaped decoration member disposed to contact the inner surface of the outer frame and the fixing portion.

* * * * *